US012730560B2

(12) United States Patent
Kim et al.

(10) Patent No.: US 12,730,560 B2
(45) Date of Patent: Sep. 8, 2026

(54) SYSTEMS, METHODS, AND APPARATUS FOR ACCESSING MEMORY WITH DIE-TO-DIE INTERFACES

(71) Applicant: Samsung Electronics Co., Ltd., Suwon-si (KR)

(72) Inventors: Soon Ju Kim, San Jose, CA (US); Hyoun Kwon Jeong, Pleasanton, CA (US); Soogil Jeong, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 13 days.

(21) Appl. No.: 18/935,341

(22) Filed: Nov. 1, 2024

(65) Prior Publication Data

US 2025/0147665 A1 May 8, 2025

Related U.S. Application Data

(60) Provisional application No. 63/568,408, filed on Mar. 21, 2024, provisional application No. 63/547,142, filed on Nov. 2, 2023.

(51) Int. Cl.
*G06F 3/06* (2006.01)

(52) U.S. Cl.
CPC .......... *G06F 3/0611* (2013.01); *G06F 3/0659* (2013.01); *G06F 3/0673* (2013.01)

(58) Field of Classification Search
CPC ..... G06F 3/0611; G06F 3/0673; G06F 3/0659
See application file for complete search history.

(56) References Cited

U.S. PATENT DOCUMENTS

| | | | | |
|---|---|---|---|---|
| 11,669,474 | B1 * | 6/2023 | Lee | G06F 1/10 710/11 |
| 12,058,874 | B1 * | 8/2024 | Farjadrad | H01L 25/0753 |
| 12,204,759 | B1 * | 1/2025 | Farjadrad | H01L 25/18 |
| 12,248,421 | B1 * | 3/2025 | Farjadrad | H03M 13/1515 |
| 12,505,065 | B2 * | 12/2025 | Das Sharma | G06F 13/4295 |
| 2021/0303212 | A1 * | 9/2021 | Chen | G06F 3/064 |
| 2021/0390179 | A1 * | 12/2021 | Hahn | G06F 21/602 |
| 2022/0222194 | A1 * | 7/2022 | Chandwani | G06F 13/1663 |
| 2022/0342841 | A1 * | 10/2022 | Choudhary | G06F 13/4291 |
| 2024/0028208 | A1 * | 1/2024 | Kim | G06F 13/1647 |

* cited by examiner

*Primary Examiner* — Henry Tsai
*Assistant Examiner* — Christopher A Daley
(74) *Attorney, Agent, or Firm* — Renaissance IP Law Group LLP

(57) ABSTRACT

An apparatus may include a die including a memory interface, a die-to-die (D2D) circuit comprising a D2D interface, and an intermediate section connected between the memory interface and the D2D interface, wherein the intermediate section comprises a transaction converter. The intermediate section may be configured to transfer data through the D2D interface using a protocol. The D2D interface may be configured to transfer data using flow control. The D2D interface may be configured to transfer data using a raw format.

20 Claims, 26 Drawing Sheets

SYSTEMS, METHODS, AND APPARATUS FOR ACCESSING MEMORY WITH DIE-TO-DIE INTERFACES

REFERENCE TO RELATED APPLICATION

This application claims priority to, and the benefit of, U.S. Provisional Patent Application Ser. No. 63/547,142 filed Nov. 2, 2023 and Ser. No. 63/568,408 filed Mar. 21, 2024 which are incorporated by reference.

TECHNICAL FIELD

This disclosure relates generally to accessing memory, and more specifically to systems, methods, and apparatus for accessing memory with die-to-die interfaces.

BACKGROUND

An integrated circuit die may include a processor and a memory device that may store data for operations performed by the processor. A memory controller, which may be connected to the memory device using a memory interface, may control access to the memory device. The processor may access the memory device by communicating with the memory controller using an on-die interface and/or protocol.

The above information disclosed in this Background section is only for enhancement of understanding of the background of the inventive principles and therefore it may contain information that does not constitute prior art.

SUMMARY

An apparatus may include a die including a memory interface, a die-to-die (D2D) circuit comprising a D2D interface, and an intermediate section connected between the memory interface and the D2D interface, wherein the intermediate section comprises a transaction converter. The intermediate section may be configured to transfer data through the D2D interface using a protocol. The D2D interface may be configured to transfer data using flow control. The D2D interface may be configured to transfer data using a raw format.

An apparatus may include a die including a memory interface, a die-to-die (D2D) circuit comprising a D2D interface, and a transaction converter connected between the memory interface and the D2D interface. The die may include a protocol layer connected between the memory interface and the D2D interface. The D2D circuit may include a link layer configured to transfer data using flow control. The D2D circuit may include a phy layer configured to transfer data using a raw format.

A method may include performing, at a die, using a memory interface, a memory transaction, converting, at the die, the memory transaction to a form for die-to-die (D2D) interface, and transferring, using the D2D interface, data associated with the memory transaction. The converting may be performed using a protocol. The D2D interface may perform the transferring using flow control. The D2D interface may perform the transferring using a raw format.

An apparatus may include a die including a memory interface, a die-to-die (D2D) circuit including a D2D interface, and an intermediate section connected between the memory interface and the D2D interface, wherein the intermediate section may include a transaction converter. The intermediate section may be configured to transfer data through the D2D interface using a protocol. The apparatus may further include a memory controller connected between the memory interface and the transaction converter. The memory interface may be connected to the transaction converter using a protocol interface. The transaction converter may be configured to convert a transaction between the protocol interface and the D2D interface. The intermediate section may include one or more compute resources. The transaction converter may be configured to convert a memory transaction to a form for the one or more compute resources. The apparatus may further include a format converter connected to the one or more compute resources and the D2D interface. The apparatus may further include a memory controller connected between the memory interface and the transaction converter, and one or more compute resources configured to perform an operation on data transferred using the transaction converter. The protocol may include an on-die protocol. The D2D circuit may transfer data using flow control. The D2D circuit may transfer data using a raw format. The D2D circuit may transfer data using signal tunneling. The D2D interface may be configured to transfer data using flow control. The transaction converter may be configured to convert a memory transaction to the D2D interface. The intermediate section may include one or more compute resources. The transaction converter may be configured to convert a memory transaction to a form for the one or more compute resources. The apparatus may further include a format converter connected to the one or more compute resources and the D2D interface. The transaction converter may be configured to convert a memory transaction to a D2D link interface. The apparatus may further include one or more compute resources configured to perform an operation on data transferred using the transaction converter, and a format converter connected to the one or more compute resources and a D2D link interface. The apparatus may further include a memory controller connected between the memory interface and the transaction converter. The D2D interface may be configured to transfer data using a raw format. The intermediate section may include one or more compute resources. The transaction converter may be configured to convert a memory transaction to a form for the one or more compute resources. The apparatus may further include a format converter connected to the one or more compute resources and the D2D interface. The intermediate section may be configured to control a reliability of data transferred using the D2D circuit. The intermediate section may be configured to detect an error in data transferred using the D2D circuit. The intermediate section may be configured to correct an error in data transferred using the D2D circuit. The transaction converter may be configured to convert a memory transaction to a D2D phy interface. The apparatus may further include one or more compute resources configured to perform an operation on data transferred using the transaction converter, and a format converter connected to the one or more compute resources and a D2D phy interface. The apparatus may further include a memory controller connected between the memory interface and the transaction converter. The transaction converter may be configured to pack data into a raw format. The transaction converter may be configured to perform a retry operation. The transaction converter may be configured to correct an error in data.

An apparatus may include a die including a memory interface, a die-to-die (D2D) circuit including a D2D interface, and a transaction converter connected between the memory interface and the D2D interface. The apparatus may further include a protocol layer connected between the memory interface and the D2D interface. The D2D circuit may include a link layer, and the D2D interface may include a D2D link interface. The protocol layer may be configured to use an on-die protocol. The apparatus may further include a memory controller connected between the memory interface and the protocol layer. The apparatus may further include a compute resource connected between the memory interface and the D2D interface. The apparatus may further include a format converter connected between the compute resource and the D2D interface. The D2D circuit may include a link layer configured to transfer data using flow control. The apparatus may further include a compute resource connected between the transaction converter and the link layer. The apparatus may further include a format converter connected between the compute resource and the link layer. The apparatus may further include a memory controller connected between the memory interface and the transaction converter. The D2D circuit may include a phy layer configured to transfer data using a raw format. The apparatus may further include a compute resource connected between the transaction converter and the phy layer. The apparatus may further include a format converter connected between the compute resource and the phy layer. The apparatus may further include a memory controller connected between the memory interface and the transaction converter. The transaction converter may be configured to pack data into the raw format. The transaction converter may be configured to perform a retry operation. The transaction converter may be configured to correct an error in data. The intermediate section may include a memory controller. The intermediate section may include one or more compute resources, An apparatus may include a die including a memory interface, a die-to-die (D2D) circuit including a D2D interface, and an intermediate section configured to transfer data using the memory interface and the D2D interface, wherein the intermediate section may include a transaction converter. The intermediate section may include a memory controller. The intermediate section may include one or more compute resources. The intermediate section may be configured to transfer data using a protocol. The D2D interface may be configured to transfer data using flow control. The D2D interface may include a D2D link interface, and the transaction converter may be configured to convert a memory transaction to the D2D link interface. The D2D interface may be configured to transfer data using a raw format. The D2D interface may include a D2D phy interface, and the transaction converter may be configured to convert a memory transaction to the D2D phy interface. The intermediate section may be configured to pack data into a raw format.

The D2D interface may include a D2D link interface, and the intermediate section may include a memory controller configured to access a memory device using the memory interface, and a transaction converter connected to the memory controller using a protocol interface, wherein the transaction converter may be configured to convert a memory transaction between the protocol interface and the D2D link interface. The D2D interface may include a D2D link interface, and the intermediate section may include a transaction converter configured to convert a memory transaction between the memory interface and the D2D link interface. The D2D interface may include a D2D phy interface, and the intermediate section may include a transaction converter configured to convert a memory transaction between the memory interface and the D2D phy interface.

The D2D interface may include a D2D link interface, and the intermediate section may include a memory controller configured to access a memory device using the memory interface, and a transaction converter connected to the memory controller using a protocol interface, a compute resource connected to the transaction converter, and a format converter connected to the compute resource and the D2D link interface, wherein the transaction converter may be configured to convert a memory transaction between the protocol interface and the compute resource, and wherein the format converter may be configured to convert one or more signals between the compute resource and the D2D link interface. The D2D interface may include a D2D link interface, and the intermediate section may include a transaction converter, a compute resource connected to the transaction converter, and a format converter connected to the compute resource and the D2D link interface, wherein the transaction converter may be configured to convert a memory transaction between the memory interface and the compute resource, and wherein the format converter may be configured to convert one or more signals between the compute resource and the D2D link interface. The D2D interface may include a D2D phy interface, and the intermediate section may include a transaction converter, a compute resource connected to the transaction converter, and a format converter connected to the compute resource and the D2D phy interface, wherein the transaction converter may be configured to convert a memory transaction between the memory interface and the compute resource, and wherein the format converter may be configured to convert one or more signals between the compute resource and the D2D phy interface.

An apparatus may include a die including a memory interface, a die-to-die (D2D) circuit including a D2D interface, and a transaction converter connected between the memory interface and the D2D interface. The apparatus may further include a protocol layer connected between the memory interface and the D2D interface. The D2D circuit may include a link layer configured to transfer data using flow control. The D2D circuit may include a phy layer configured to transfer data using a raw format. The intermediate section may be configured to perform a retry operation. The intermediate section may be configured to perform an error correction operation.

An apparatus may include a die including a memory interface, a die-to-die (D2D) circuit including a D2D interface, and a transaction converter configured to transfer data using the memory interface and the D2D interface.

A method may include performing, at a die, using a memory interface, a memory transaction, converting, at the die, the memory transaction to a form for a die-to-die (D2D) interface, and transferring, using the D2D interface, data associated with the memory transaction.

A method may include performing, at a die, using a memory interface, a memory transaction, converting, at the die, the memory transaction to a form for a die-to-die (D2D) interface, and transferring, using the D2D interface, data associated with the memory transaction. The converting may be performed using a protocol. The D2D interface may perform the transferring using flow control. The D2D interface may perform the transferring using a raw format.

BRIEF DESCRIPTION OF THE DRAWINGS

The figures are not necessarily drawn to scale and elements of similar structures or functions or portions thereof may generally be represented by reference indicators ending in, and/or containing, the same digits, letters, and/or the like, for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
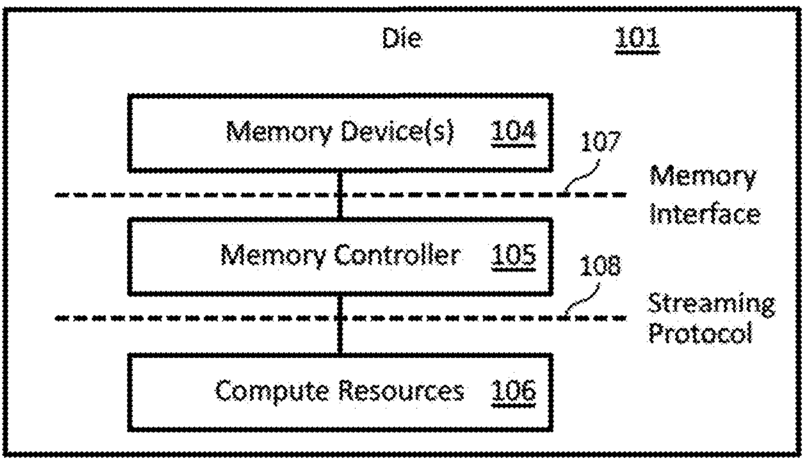
FIG. 1 illustrates an embodiment of die having compute resources and one or more memory devices in accordance with example embodiments of the disclosure.

A processor and a memory device may be fabricated on the same integrated circuit die to enable the processor to write and/or read data to and/or from the memory device at relatively high speed. The memory capacity available to the processor may be increased by increasing the number of memory devices fabricated on the die. However, a memory device may consume a relatively large amount of die area, power, and/or the like. Thus, it may be difficult and/or impractical to increase the number of memory devices fabricated on a die.

A memory access scheme in accordance with example embodiments of the disclosure may use a die-to-die (D2D) interface to enable a processor or other apparatus on a first die to communicate with a memory device on a second die. Depending on the implementation details, this may increase the amount of memory available to the processor or other apparatus by increasing the number, capacity, types, and/or the like, of memory devices that may be accessed by the first die. For example, the first die may be fabricated with one or more D2D interfaces that may enable a processor on the first die to access one or more memory devices (which may be difficult or impractical to fabricate on the first die) on a second die and/or other dies, Some memory access schemes in accordance with example embodiments of the disclosure may use a transaction converter to convert a memory transaction such as a write transaction, a read transaction, and/or the like, to a form that may be used by a D2D interface, one or more compute resources, a memory controller, and/or the like, on the same or a different die. For example, in some embodiments, a transaction converter may convert one or more write and/or read transactions for a memory controller to a format that may be used by a D2D link layer interface on the same die.

Memory access schemes in accordance with example embodiments of the disclosure may implement a variety of component configurations, protocols, formats, data transfer modes, and/or the like. For example, some embodiments may implement a D2D interface configuration with relatively more layers that, depending on the implementation details, may enable the use of one or more existing protocols, circuit designs, and/or the like. As another example, some embodiments may implement a D2D interface configuration with relatively fewer layers that, depending on the implementation details, may reduce latency and/or involve the development of one or more additional circuit designs.

Some memory access schemes in accordance with example embodiments of the disclosure may use a D2D interface configuration that may involve the use of a protocol to transfer data. For example, in some embodiments, a die may include a memory interface, a D2D link interface, and an intermediate section having a memory controller that implements a protocol interface (e.g., an on-die protocol interface) for memory transactions. The intermediate section may include a transaction converter that may convert memory transactions to and/or from a form that may be used by the D2D link interface. In some embodiments, and depending on the implementation details, at least a portion of the intermediate section may be referred to, and/or characterized as, a protocol layer.

Some memory access schemes in accordance with example embodiments of the disclosure may use a D2D interface configuration that may implement flow control, for example, at a link layer. In some example embodiments, a D2D interface configuration may implement flow control by transferring data using flow control units (which may also be referred to as flits). Depending on the implementation details, the use of a D2D interface with flow control may reduce latency, for example, by reducing or eliminating a protocol layer and/or other apparatus associated with implementing a protocol.

Some memory access schemes in accordance with example embodiments of the disclosure may use a D2D interface configuration that may transfer data using a raw format, for example, at a physical layer (which may also be referred to as a phy or PHY layer). In some example embodiments, a die may include a transaction converter that may convert memory transactions to a raw format that may be used by a D2D phy interface. For example, a transaction converter may pack data from one or more transactions into one or more transfer units that may be used a raw format D2D interface. Depending on the implementation details, the use of a D2D phy interface with a raw format may reduce latency, for example, by reducing or eliminating a link layer and/or other apparatus associated with implementing a link layer.

This disclosure encompasses numerous aspects relating to accessing memory using D2D interfaces. The aspects disclosed herein may have independent utility and may be embodied individually, and not every embodiment may utilize every aspect. Moreover, the aspects may also be embodied in various combinations, some of which may amplify some benefits of the individual aspects in a synergistic manner.

FIG. 1 illustrates an embodiment of die having compute resources and one or more memory devices in accordance with example embodiments of the disclosure. The die 101 illustrated in FIG. 1 may include one or more memory devices 104, a memory controller 105, and/or compute resources 106. The one or more memory devices 104 may be accessed by the memory controller 105 using one or more memory interfaces 107. The compute resources 106 may access the one or more memory devices 104 through the memory controller 105 using an interface 108 and/or a corresponding protocol.

The die 101, which may also be referred to as a chip, may be implemented, for example, as a system-on-chip (SoC). The compute resources 106 may include one or more processors such as one or more of a central processing unit (CPU), graphics processing unit (GPU), neural processing unit (NPU), tensor processing unit (TPU), and/or the like.

Fabricating the compute resources 106 and one or more memory devices 104 on the same die 101 may enable data to be transferred between the compute resources 106 and one or more memory devices 104 at relatively high speeds, for example, due to relatively short electrical paths between components. The amount of memory accessible by the compute resources 106 may be increased by increasing the number and/or size of memory devices 104 fabricated on the die 101, fabricating different types of memory devices 104 having higher capacity on the die 101, and/or the like.

However, increasing the amount of memory using one or more of these techniques may be difficult and/or impractical for a number of reasons. For example, a memory device 104 may consume a relatively large amount of die area and/or power. This may be especially true, for example, with high bandwidth memory (HBM) which may have a relatively large area footprint and/or power consumption. Thus, fabricating a larger memory device and/or a larger number of memory devices 104 may be limited by the amount of die area and/or power available on the die 101. As another example, a larger memory device and/or a larger number of memory devices 104 on the die 101 may cause thermal problems associated with greater power consumption, power dissipation, device geometry, and/or the like. As a further example, different types of memory devices that have a relatively high memory density may involve the use of fabrication and/or assembly processes that may be incompatible with those used for one or more other components on the die 101.

Figure 2:
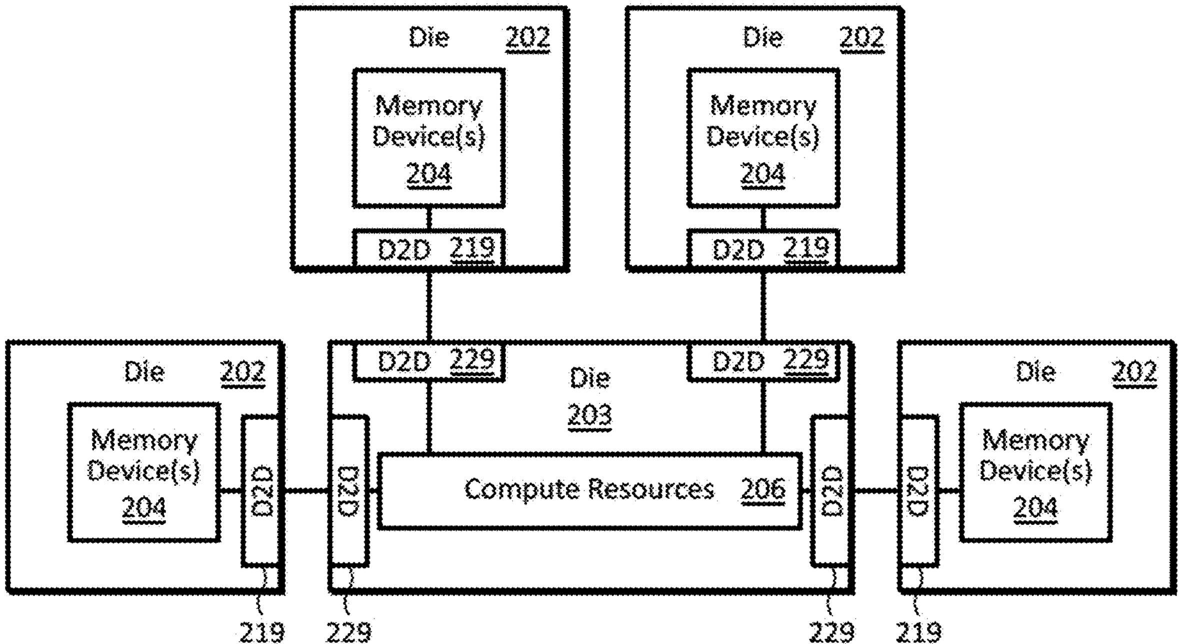
FIG. 2 illustrates an embodiment of a die connected to one or more memory devices on one or more additional dies in accordance with example embodiments of the disclosure.

FIG. 2 illustrates an embodiment of a die connected to one or more memory devices on one or more additional dies in accordance with example embodiments of the disclosure. The embodiment illustrated in FIG. 2 may include a first die 203 and one or more second dies 202. The first die 203 may include compute resources 206, and each of the second dies 202 may include one or more memory devices 204. The compute resources 206 may be connected to one or more memory devices 204 through one or more D2D circuits 229 (which may also be referred to as D2D interface circuits) on the first die 203 and one or more corresponding D2D circuits 219 on the one or more second dies 202.

In some embodiments, and depending on the implementation details, the embodiment illustrated in FIG. 2 may at least partially overcome one or more of the difficulties and/or impracticalities associated with increasing the amount of memory accessible by the compute resources 206 as discussed above with respect to FIG. 1. For example, because a D2D circuit 229 may consume less die area, power, and/or the like, than a memory device 204, the compute resources 206 may be connected to a relatively large memory device 204 that may not otherwise fit on the first die 203 and/or to a memory device 204 that may consume more power than is available on the first die 203. Additionally, or alternatively, the compute resources 206 may be connected to more than one memory device 204 on more than one second die 202, for example, through more than one pairs of corresponding D2D circuits 219 and 229. Additionally, or alternatively, the compute resources 206 may be connected to one or more memory devices 204 on one or more second dies 202 that may have a relatively high memory density but may involve a fabrication and/or assembly process that may be incompatible with those used for the first die 203.

Figure 3:
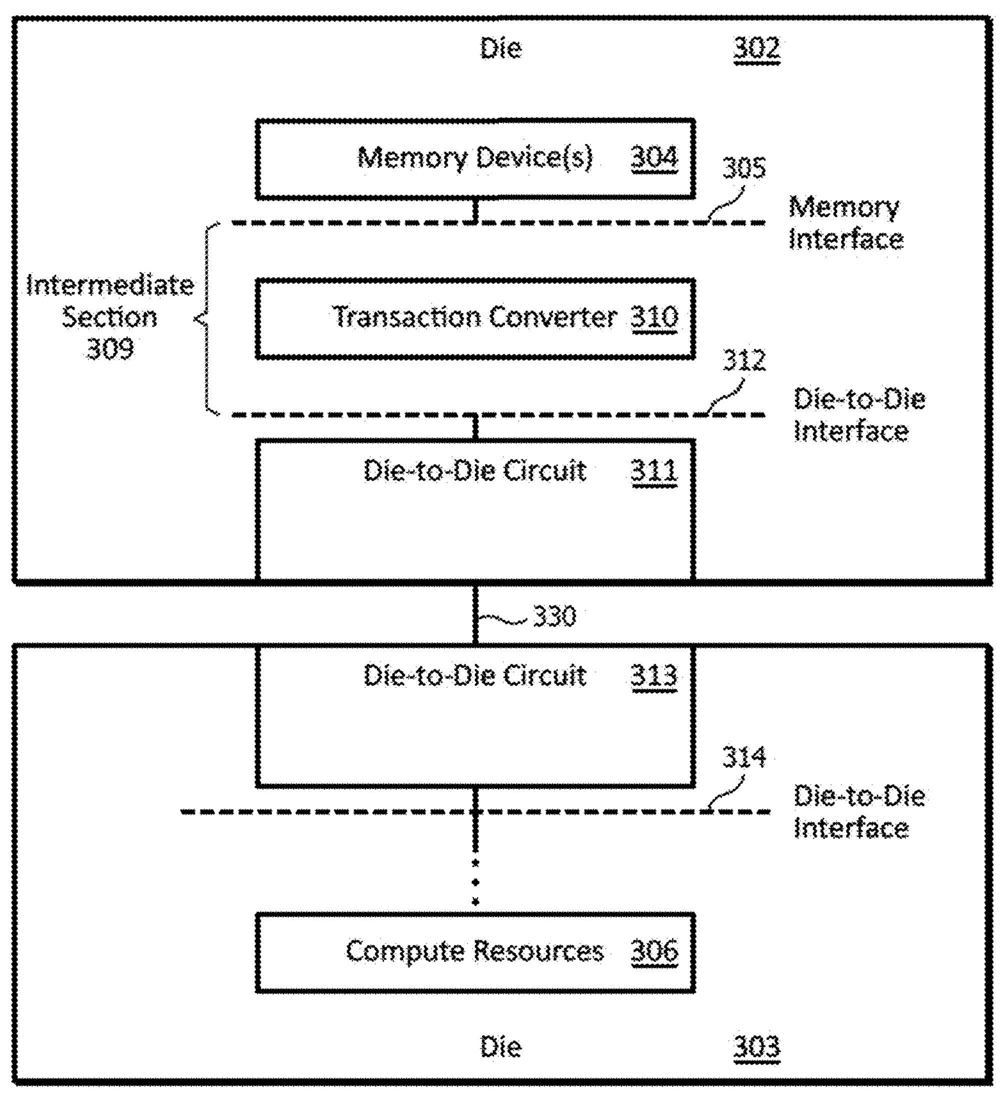
FIG. 3 illustrates an embodiment of a memory access scheme in accordance with example embodiments of the disclosure.

FIG. 3 illustrates an embodiment of a memory access scheme in accordance with example embodiments of the disclosure. The embodiment illustrated in FIG. 3 may include a first die 302 and a second die 303. The first die 302 may include a first D2D circuit 311 that may implement a first D2D interface 312. The second die 303 may include a second D2D circuit 313 that may implement a second D2D interface 314. The first and second D2D circuits 311 and 313 may be connected through one or more D2D lanes, links, interconnects, and/or the like 330.

The first die 302 may include one or more memory devices 304 that may be accessed through a memory interface 305. The first die 302 may include an intermediate section 309 connected to (e.g., between) the memory interface 305 and the first D2D interface 312. The intermediate section 309 may include a transaction converter 310.

The second die 303 may include one or more compute resources 306 that may access the one or more memory devices 304 using the first and second D2D circuits 311 and 313 and/or one or more other components illustrated in FIG. 3. Additionally, or alternatively, the second die 303 may include one or more components that may enable the second die 303 to communicate, operate, and/or the like, with any other component in the overall signal path from the one or more memory devices 304 and the compute resources 306. For example, if the transaction converter 310 converts one or more transactions between a format for the memory interface 305 and a format that may be used by the D2D interfaces 312 and/or 314, the second die 303 may include one or more components to convert the one or more transactions back to the format for the memory interface 305. As another example, if the intermediate section 309 does not include a memory controller, the second die 303 may include a memory controller.

Either or both of the first die 302 and/or the second die 303 may be implemented as dies (which may also be referred to as chips), dielets (which may also be referred to as chiplets), and/or any other type of integrated circuit device.

In some embodiments, the memory access scheme illustrated in FIG. 3 may be implemented as a system-in-package (SIP). For example, the first die 302 and the second die 303 may be attached to a package substrate and connected using one or more traces, semiconductor (e.g., silicon) bridges and/or the like. As another example, the first die 302 and the second die 303 may be attached to an interposer (e.g., a semiconductor interposer such as chip-on-wafer-on-substrate (CoWoS)) and connected using one or more traces, semiconductor bridges, and/or the like on the interposer, a substrate to which the interposer is attached, and/or the like. As a further example, the first die 302 and the second die 303 may each be attached to separate interposers and connected using one or more traces, semiconductor bridges, and/or the like on and/or between one or more of the interposers, substrate to which the interposers are attached, and/or the like.

Additionally, or alternatively, the first die 302 and the second die 303 may be located in separate packages and connected, for example, using one or more retimers as may be specified, for example, in association with a D2D protocol.

The one or more memory devices 304 may be implemented, for example, using one or more of a high bandwidth memory (HBM) memory device, double data rate (DDR) memory device, low-power DDR (LPDDR) memory device, graphics DDR (GDDR) memory device, Open Memory Interface (OMI) memory device, Gen-Z memory device, and/or the like, of any generation, version, and/or the like, or combination thereof.

The memory interface 305 may be implemented, for example, using any of an HBM memory interface, DDR PHY Interface (DFI), Universal Memory Interface (UMI), DDR interface, LPDDR interface, GDDR interface, OMI interface, Gen-Z interface, and/or the like, of any generation, version, and/or the like, or combination thereof, as may be related to or used by memory devices 304.

The first D2D circuit 311 and/or the second D2D circuit 313, and/or interfaces and/or protocols used therewith, may be implemented, for example, using Universal Chiplet Interconnect Express (UCIe), Advanced Interface Bus (AIB), Interlaken, Bunch of Wires (BOW), Open High Bandwidth Interconnect (OpenHBI), and/or the like, of any generation, version, and/or the like, or combination thereof.

The transaction converter 310 may convert one or more transactions (e.g., one or more memory write transactions, memory read transactions, and/or the like) of the memory interface 305 to and/or from a form that may be used by a D2D interface 312 and/or 314 and/or any other apparatus in the intermediate section 309. Additionally, or alternatively, the transaction converter 310 may convert any type of transaction from any format to any format that may be used by any component, interface, protocol, and/or the like. For example, in some embodiments, the transaction converter 310 may convert a transaction from a protocol that may be used by a memory controller to and/or from a format used by one or more compute resources, network-on-chips (NOCs), and/or the like.

In some embodiments, a transaction such as a memory transaction may be implemented with one or more signal operations such as signal states, timings, patterns, and/or the like, of one or more signal channels, buses, and/or the like (e.g., one or more write request channels, write data channels, write response channels, read request channels, read data channels, and/or the like).

In some embodiments, either or both of the first D2D circuit 311 and/or the second D2D circuit 313 may be implemented with one or more layers. For example, either or both of the first D2D circuit 311 and/or the second D2D circuit 313 may be implemented with one or more of a physical layer, a link layer, an adapter layer, a protocol layer, a transport layer, and/or the like, or a combination thereof.

In some embodiments, either or both of the first D2D circuit 311 and/or the second D2D circuit 313 may transfer data using one or more flit formats, raw formats, signal tunneling (e.g., using a signal bus), and/or the like.

In some embodiments, either or both of the first D2D circuit 311 and/or the second D2D circuit 313 may implement, or be implemented with, one or more interfaces of which the D2D interfaces 312 and/or 314 may be examples. For example, either or both of the first D2D circuit 311 and/or the second D2D circuit 313 may implement, or be implemented with, one or more of a phy interface, link interface, raw D2D interface (RDI), flit-aware D2D interface (FDI), streaming interface, and/or the like.

In some embodiments, the first die 302 may be referred to, implemented as, and/or characterized as, a buffer die, a base die, a logic die, and/or the like. For example, in some embodiments, the first die 302 may be implemented with, as an alternative to, and/or as an extension of, a base die of an HBM device, a through silicon via (TSV) landing of an HBM device, and/or any other stacked memory device. In some embodiments, the second die 303 may be referred to, implemented as, and/or characterized as, a compute die, a processing die, and/or the like.

Figure 4:
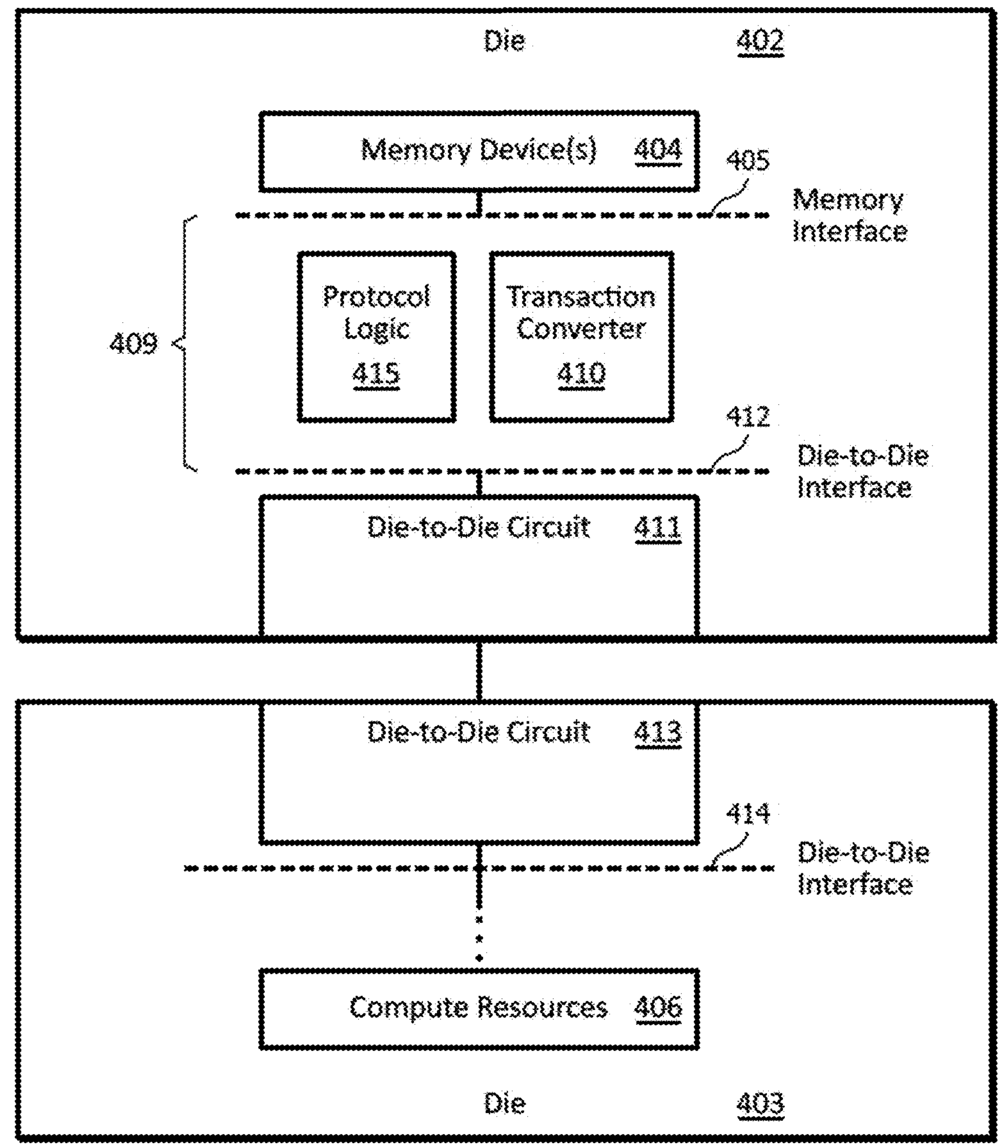
FIG. 4 illustrates an embodiment of a memory access scheme that may use a protocol to communicate using a D2D interface in accordance with example embodiments of the disclosure.

FIG. 4 illustrates an embodiment of a memory access scheme that may use a protocol to communicate using a D2D interface in accordance with example embodiments of the disclosure. The embodiment illustrated in FIG. 4 may be implemented with, or be used to implement, for example, the embodiment illustrated in FIG. 3 in which similar elements may be indicated by reference indicators ending in, and/or containing, the same digits, letters, and/or the like. In the embodiment illustrated in FIG. 4, the intermediate section 409 may include protocol logic 415 that may implement, alone or in combination with one or more other components, one or more protocols and/or associated interfaces.

Examples of protocols and/or interfaces that may be implemented by the protocol logic 415 and/or any other component and/or embodiments disclosed herein may include one or more of Advanced Microcontroller Bus Architecture (AMBA) (including one or more of the AMBA family of protocols such as Advanced extensible Interface (AXI), Coherent Hub Interface (CHI), AMBA High-performance Bus (AHB), AXI Coherency Extensions (ACE), and/or Advanced Peripheral Bus (APB)), Cache Coherent Interconnect for Accelerators (CCIX), Credited extensible Stream (CXS), On-Chip Protocol (OCP), Device Transaction Level (DTL), Peripheral Component Interconnect Express (PCIe), Compute Express Link (CXL), any other streaming and/or nonstreaming protocols, and/or the like.

In some embodiments, some or all of the intermediate section 409 may implement, and/or be characterized as, a protocol layer. For example, in some embodiments, the protocol logic 415, alone or in combination with one or more other components, may implement a protocol layer for the D2D circuit 411.

Depending on the implementation details, protocol logic 415 may enable the die 402 (e.g., a buffer die) to be implemented using an existing protocol and may involve little or no modification to an existing die 403 (e.g., an existing compute die).

Figure 5:
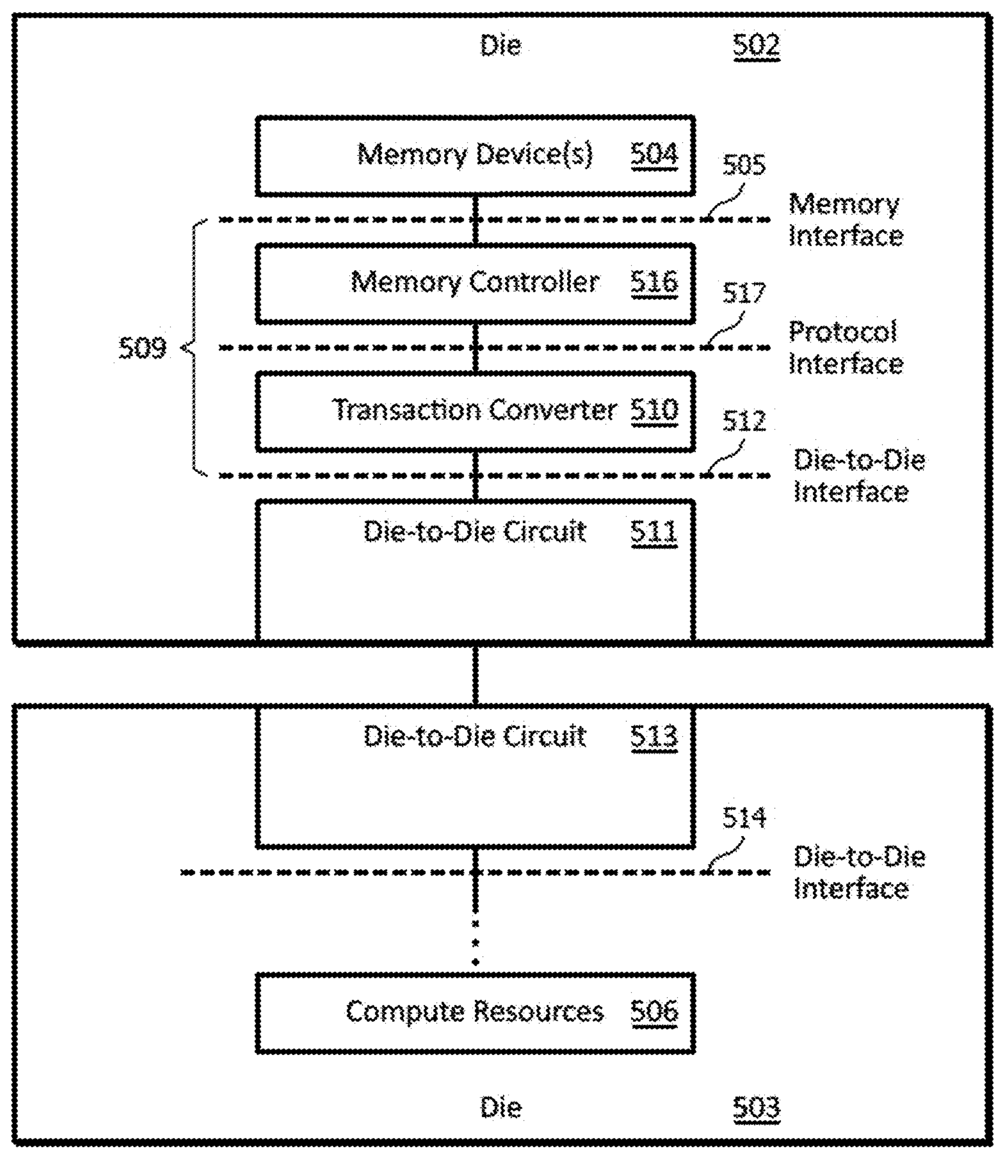
FIG. 5 illustrates an example embodiment of a memory access scheme that may use a protocol to communicate using a D2D interface in accordance with example embodiments of the disclosure.

FIG. 5 illustrates an example embodiment of a memory access scheme that may use a protocol to communicate using a D2D interface in accordance with example embodiments of the disclosure. The embodiment illustrated in FIG. 5 may be implemented with, or be used to implement, for example, the embodiment illustrated in FIG. 4 in which similar elements may be indicated by reference indicators ending in, and/or containing, the same digits, letters, and/or the like.

In the embodiment illustrated in FIG. 5, the intermediate section 509 may include a memory controller 516 that may be connected to the one or more memory devices 504 using a memory interface 505. The memory controller 516 may also be connected to the transaction converter 510 using a protocol interface 517. The transaction converter 510 may be connected to the D2D circuit 511 using the D2D interface 512.

Depending on the implementation details, the embodiment illustrated in FIG. 5 may enable a circuit design for a memory controller 516 to be implemented using an existing protocol (e.g., an on-die (OD) protocol) and may involve little or no modification to the second die 503 (e.g., an existing compute die). Moreover, in some embodiments, and depending on the implementation details, locating the memory controller 516 on the first die 502 (e.g., a buffer die) may reduce or eliminate the amount of die area, power consumption, and/or the like, that may have been used for one or more memory controllers at the second die 503 (e.g., one or more memory controllers per memory channel), thereby freeing such die area, power consumption, and/or the like, for other uses such as additional compute resources 506. In such an embodiment, one or more of the components may be configured using one or more sideband signals (e.g., a sideband link for a lane module of a D2D circuit).

Figure 6:
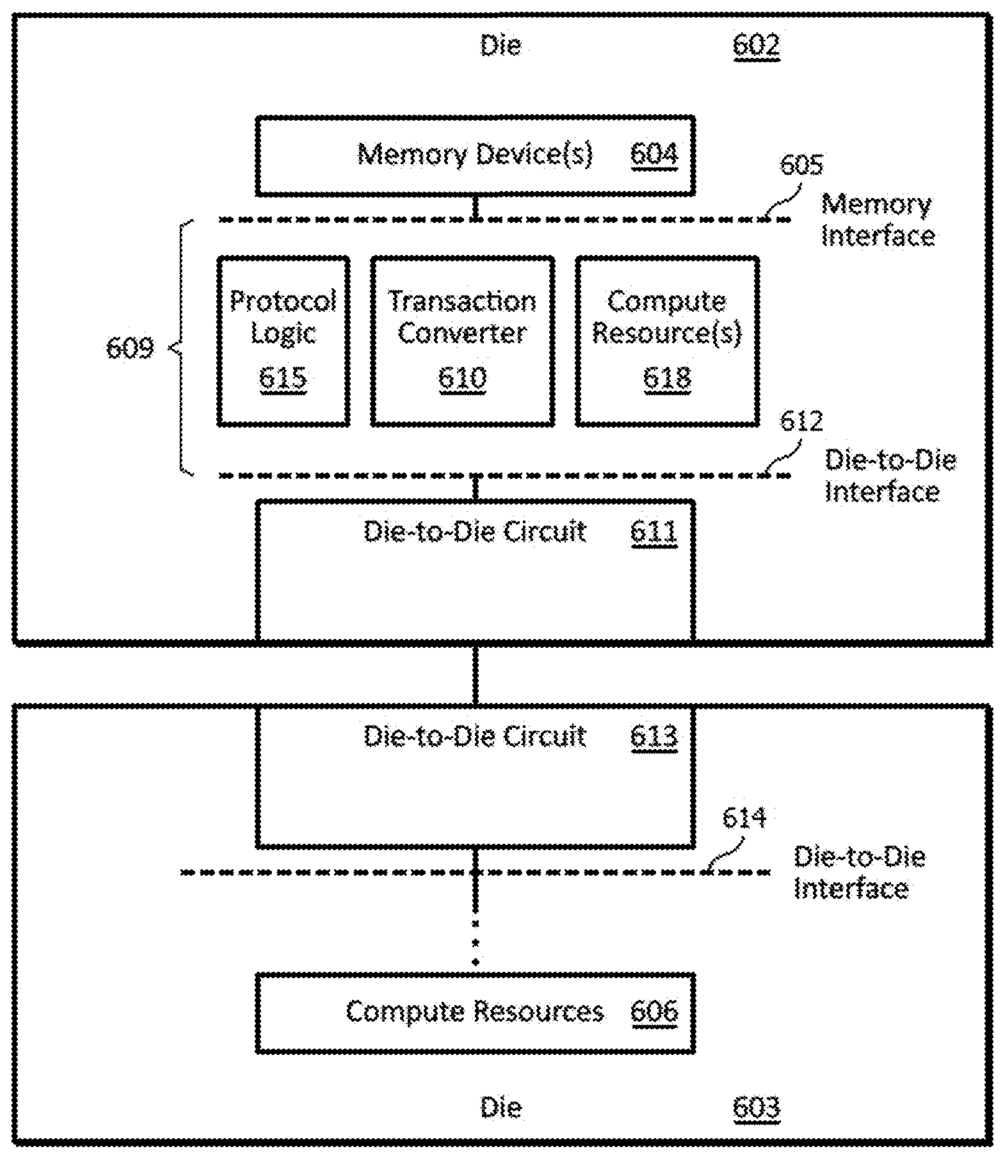
FIG. 6 illustrates an embodiment of a memory access scheme that may include one or more compute resources in accordance with example embodiments of the disclosure.

FIG. 6 illustrates an embodiment of a memory access scheme that may include one or more compute resources in accordance with example embodiments of the disclosure. The embodiment illustrated in FIG. 6 may be implemented with, or be used to implement, for example, the embodiment illustrated in FIG. 3 or FIG. 4 in which similar elements may be indicated by reference indicators ending in, and/or containing, the same digits, letters, and/or the like. In the embodiment illustrated in FIG. 6, the intermediate section 609 may include one or more compute resources 618 that may perform one or more operations using data transferred through the D2D interface 612 and/or through the memory interface 605.

Examples of compute resources 618 may include circuitry such as combinational logic, sequential logic, timers, counters, registers, state machines, embedded processors, microcontrollers, accelerators, CPUs, GPUs, NPUs, TPUs, digital signal processors (DSPs), and/or the like, that may execute instructions stored in any type of memory and/or implement any type of execution environment such as a container, a virtual machine, an operating system, and/or the like, or a combination thereof.

In some embodiments, one or more compute resources 618 may be implemented with, and/or used to implement, a network-on-chip (NOC). For example, in some embodiments, an NOC may include a network of nodes interconnected with links and arranged in a topology such as a mesh, a tree, a star, and/or the like. Some nodes may include switches, routers, hubs, and/or the like, to direct data traffic between nodes using coherent and/or non-coherent connections. Some nodes may include interfaces (e.g., protocol interfaces, memory interfaces, D2D interfaces, and/or the like) using one or more protocols, formats, and/or the like, to connect the NOC to other apparatus such as transaction converters, memory controllers, memory devices, format converters, D2D circuits, other NOCs, and/or the like. Some nodes may include compute resources such as processors (e.g., CPUs, GPUs, NPUs, TPUs, and/or the like), accelerators, and/or the like, that may perform operations using data transferred to and/or from other nodes. Some nodes may include memory resources that may be used, for example, as caches, buffers, and/or the like, for data transferred between other nodes.

In some embodiments, an NOC may be arranged to transfer data between nodes within the NOC as well as other components in an unlimited variety of configurations. For example, in some embodiments, an NOC may be arranged to route some data transfers between two interfaces (e.g., memory interface 605 and D2D interface 612) and to route other data transfers between an interface and a compute resource (e.g., a processor, an accelerator, and/or the like). Thus, in some embodiments, some data transfers through an NOC direct data to and/or from one or more compute resources, whereas other data transfers may bypass compute resources.

In some embodiments, at least a portion of the one or more compute resources 618 may be implemented with resources that may enable one or more operations that may otherwise be performed by the compute resources 606 at the second die 603 (e.g., a compute die) to be performed at the first die 602 (e.g., a buffer die). Thus, one or more compute operations may be offloaded from the second die 603 to the first die 602. Depending on the implementation details, this may reduce the latency, power consumption, and/or the like, associated with performing an operation, for example, by reducing or eliminating the transfer of data between the first die 602 and the second die 603.

Figure 7:
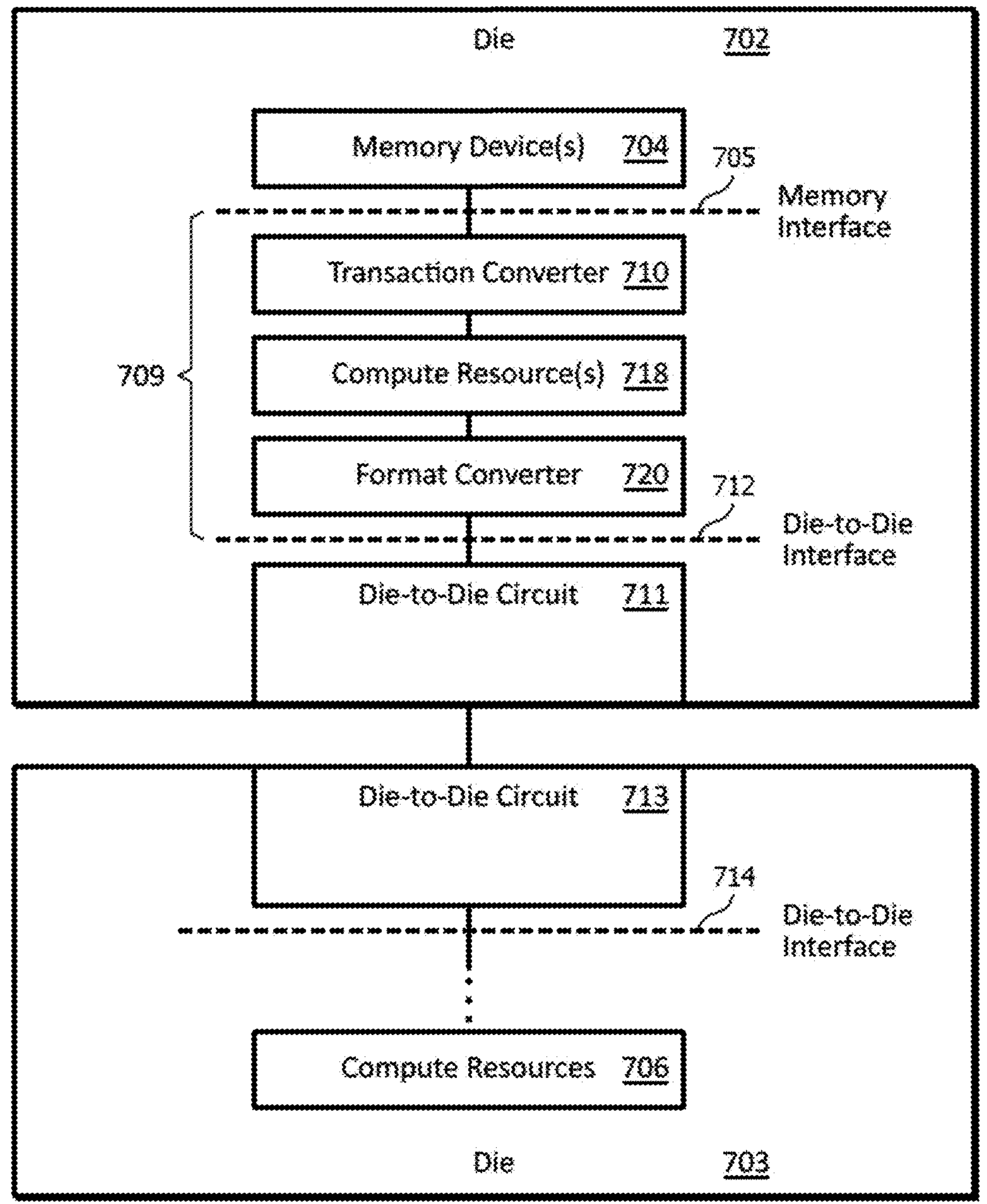
FIG. 7 illustrates an example embodiment of a memory access scheme that may include one or more compute resources in accordance with example embodiments of the disclosure.

FIG. 7 illustrates an example embodiment of a memory access scheme that may include one or more compute resources in accordance with example embodiments of the disclosure. The embodiment illustrated in FIG. 7 may be implemented with, or be used to implement, for example, the embodiment illustrated in FIG. 6 in which similar elements may be indicated by reference indicators ending in, and/or containing, the same digits, letters, and/or the like.

The embodiment illustrated in FIG. 7 may include a transaction converter 710, one or more compute resources 718 (which in some embodiments may be implemented at least partially with an NOC), and/or a format converter 720. The transaction converter 710 may convert one or more transactions between a format used for the memory interface 705 and a format used by the one or more compute resources 718. The format converter 720, which may be implemented, for example, as a transaction converter, may convert one or more signals between a format used by the one or more compute resources 718 and a format used by the D2D interface 712.

In some embodiments, one or more components in the intermediate section 709 and/or D2D circuit 711 may implement one or more features of the protocol logic 415 illustrated in FIG. 4.

Figure 25:
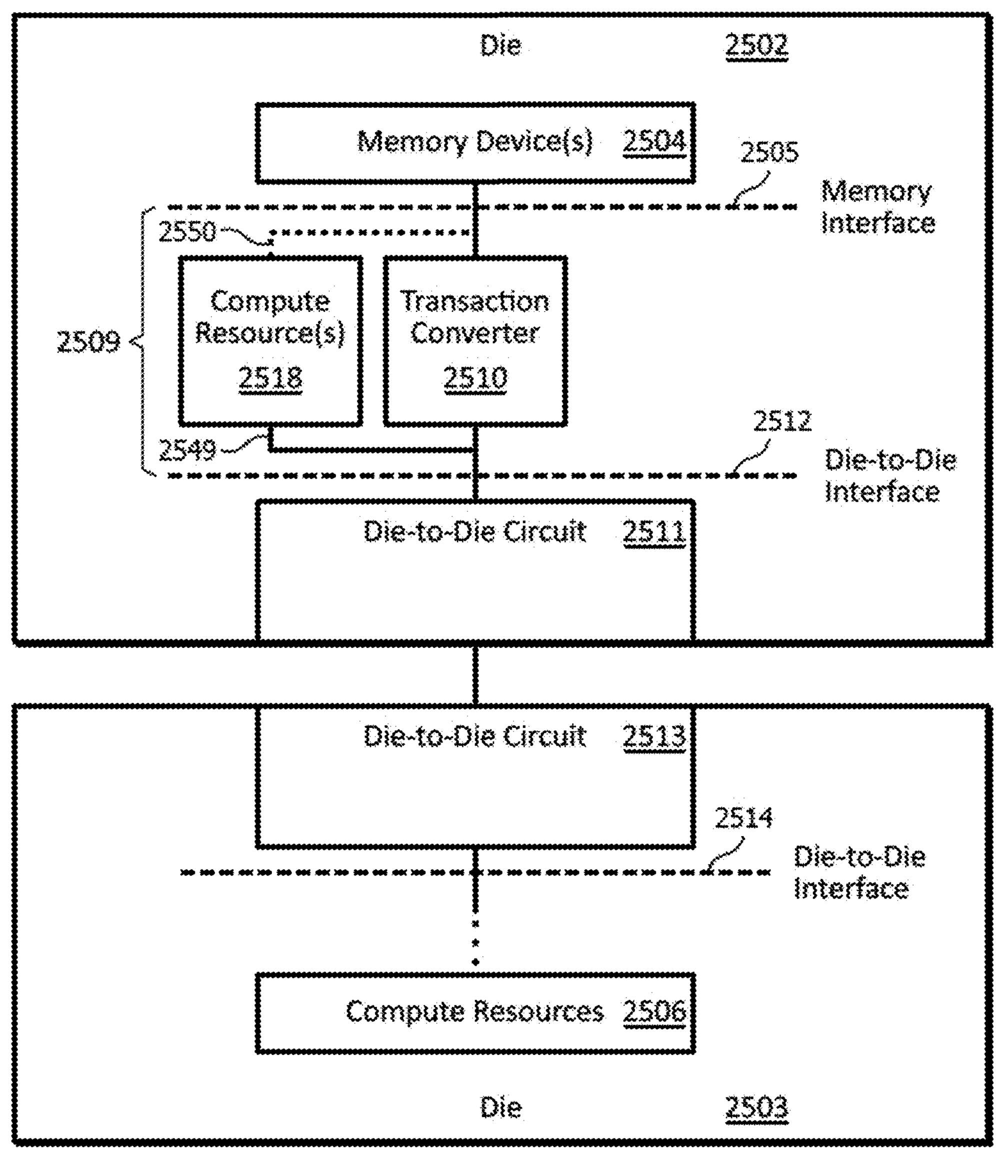
FIG. 25 illustrates an embodiment of a memory access scheme that may one or more compute resources in accordance with example embodiments of the disclosure.

Although the one or more compute resources 718 may be illustrated as being connected in series with the transaction converter 710 and/or format converter 720, in some implementations of the embodiment illustrated in FIG. 7, as well as any other embodiments that may include one or more compute resources, at least a portion of the one or more compute resources 718 may be configured in a manner in which data flowing between a memory interface 705 and a D2D interface 712 may bypass all or a portion of the one or more compute resources 718, for example, as illustrated in FIG. 25.

Figure 8:
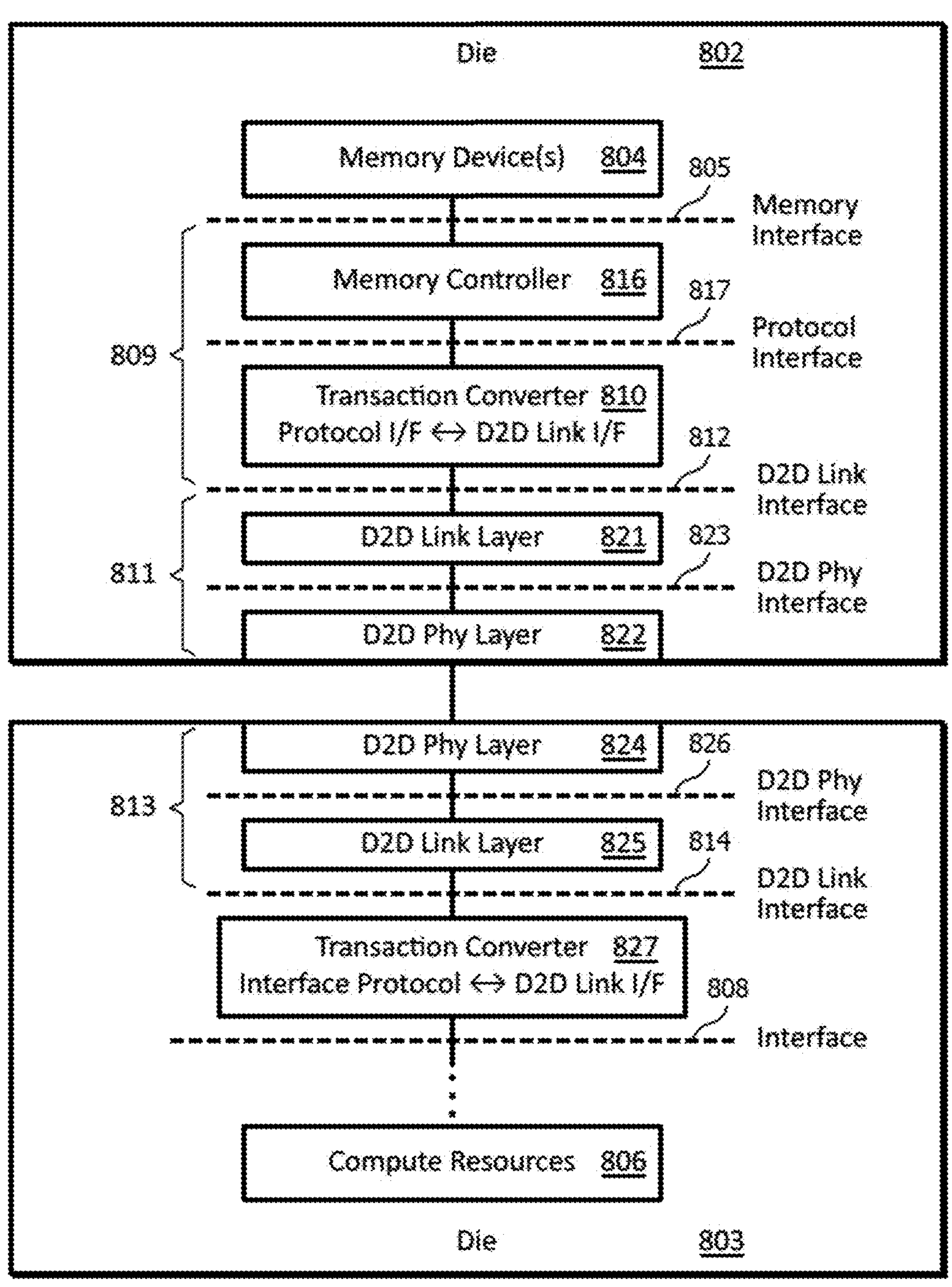
FIG. 8 illustrates an example embodiment of a memory access scheme that may include a memory controller on a die with one or more memory devices in accordance with example embodiments of the disclosure.

FIG. 8 illustrates an example embodiment of a memory access scheme that may include a memory controller on a die with one or more memory devices in accordance with example embodiments of the disclosure. The embodiment illustrated in FIG. 8 may be implemented with, or be used to implement, for example, the embodiment illustrated in FIG. 5 in which similar elements may be indicated by reference indicators ending in, and/or containing, the same digits, letters, and/or the like.

The embodiment illustrated in FIG. 8 may include a memory controller 816 on the first die 802. The first D2D circuit 811 may be implemented with a D2D phy layer 822 that may implement a D2D phy interface 823 and/or a link layer 821 that may implement a D2D link interface 812. The second D2D circuit 813 may be implemented with a D2D phy layer 824 that may implement a D2D phy interface 826 and/or a link layer 825 that may implement a D2D link interface 814.

The transaction converter 810 on the first die 802 may convert one or more transactions between a format used by the protocol interface 817 for the memory controller 816 and a format used by the D2D link interface 812 of the D2D link layer 821. The transaction converter 827 on the second die 803 may convert one or more transactions between a format used by the D2D link layer 825 and a format used by an interface 808 and/or any other format that may be used by the second die 803.

In some embodiments, a link layer such as 821 and/or 825 may implement one or more data reliability features such as error detection (e.g., cyclic redundancy check (CRC)), retry, and/or the like.

Figure 9:
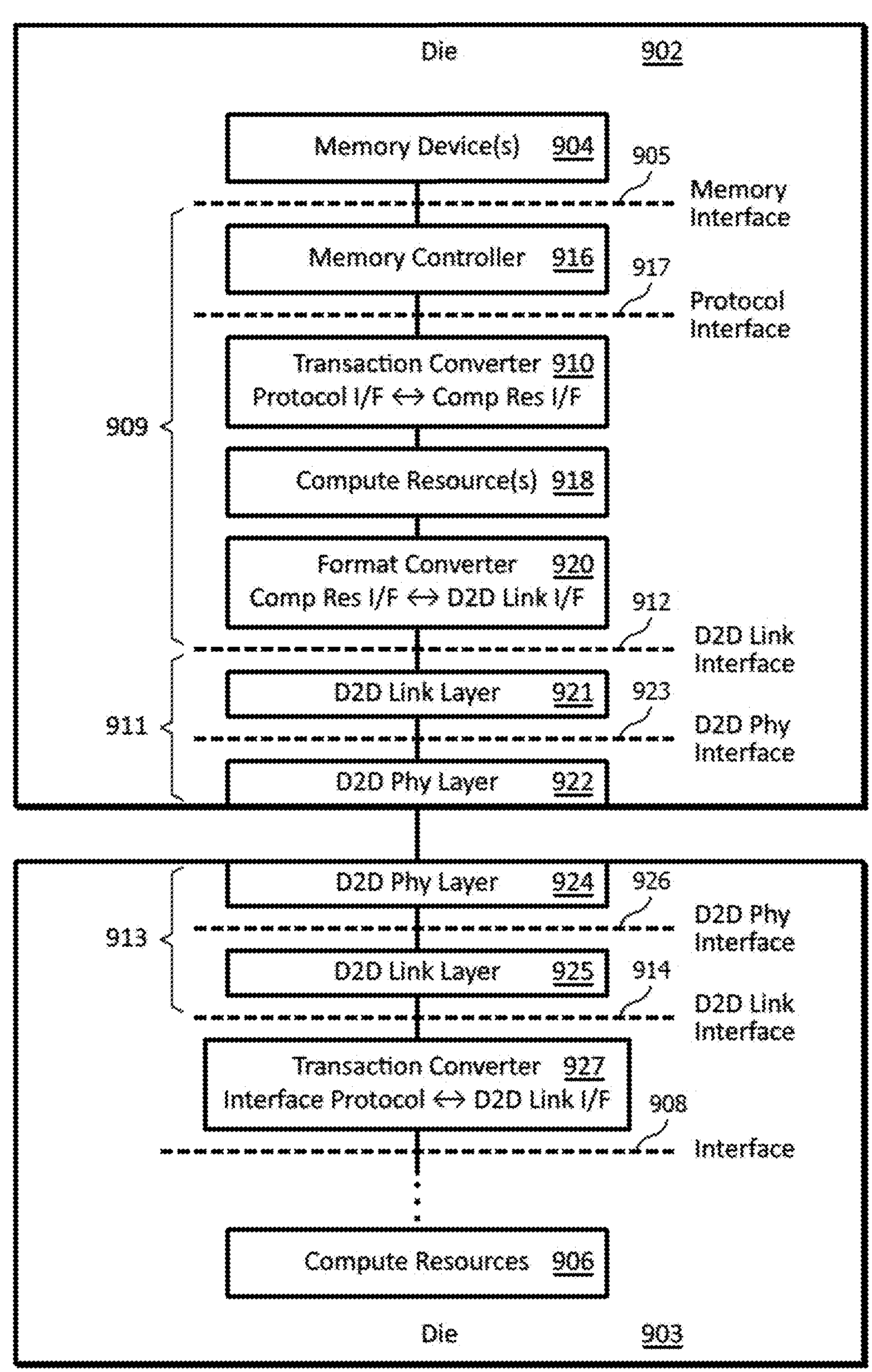
FIG. 9 illustrates an example embodiment of a memory access scheme that may include one or more compute resources in accordance with example embodiments of the disclosure.

FIG. 9 illustrates an example embodiment of a memory access scheme that may include one or more compute resources in accordance with example embodiments of the disclosure. The embodiment illustrated in FIG. 9 may be implemented with, or be used to implement, for example, the embodiment illustrated in FIG. 7 in which similar elements may be indicated by reference indicators ending in, and/or containing, the same digits, letters, and/or the like.

The embodiment illustrated in FIG. 9 may include a memory controller 916, and/or one or more compute resources 918 which in some embodiments may be implemented at least partially with an NOC.

The first D2D circuit 911 may be implemented with a phy layer 922 that may implement a D2D phy interface 923 and/or a link layer 921 that may implement a D2D link interface 912. The second D2D circuit 913 may be implemented with a phy layer 924 that may implement a D2D phy interface 926 and/or a link layer 925 that may implement a D2D link interface 914.

The transaction converter 910 on the first die 902 may convert one or more transactions between a format used by the protocol interface 917 for the memory controller 916 and a format used by the one or more compute resources 918. The format converter 920, which may be implemented, for example, as a transaction converter, may convert one or more signals between a format used by the one or more compute resources 918 and a format used by the D2D link interface 912 of the D2D link layer 921. The transaction converter 927 on the second die 903 may convert one or more transactions between a format used by the D2D link layer 925 and a format used by an interface 908 and/or corresponding protocol and/or any other format that may be used by the second die 903.

Figure 10:
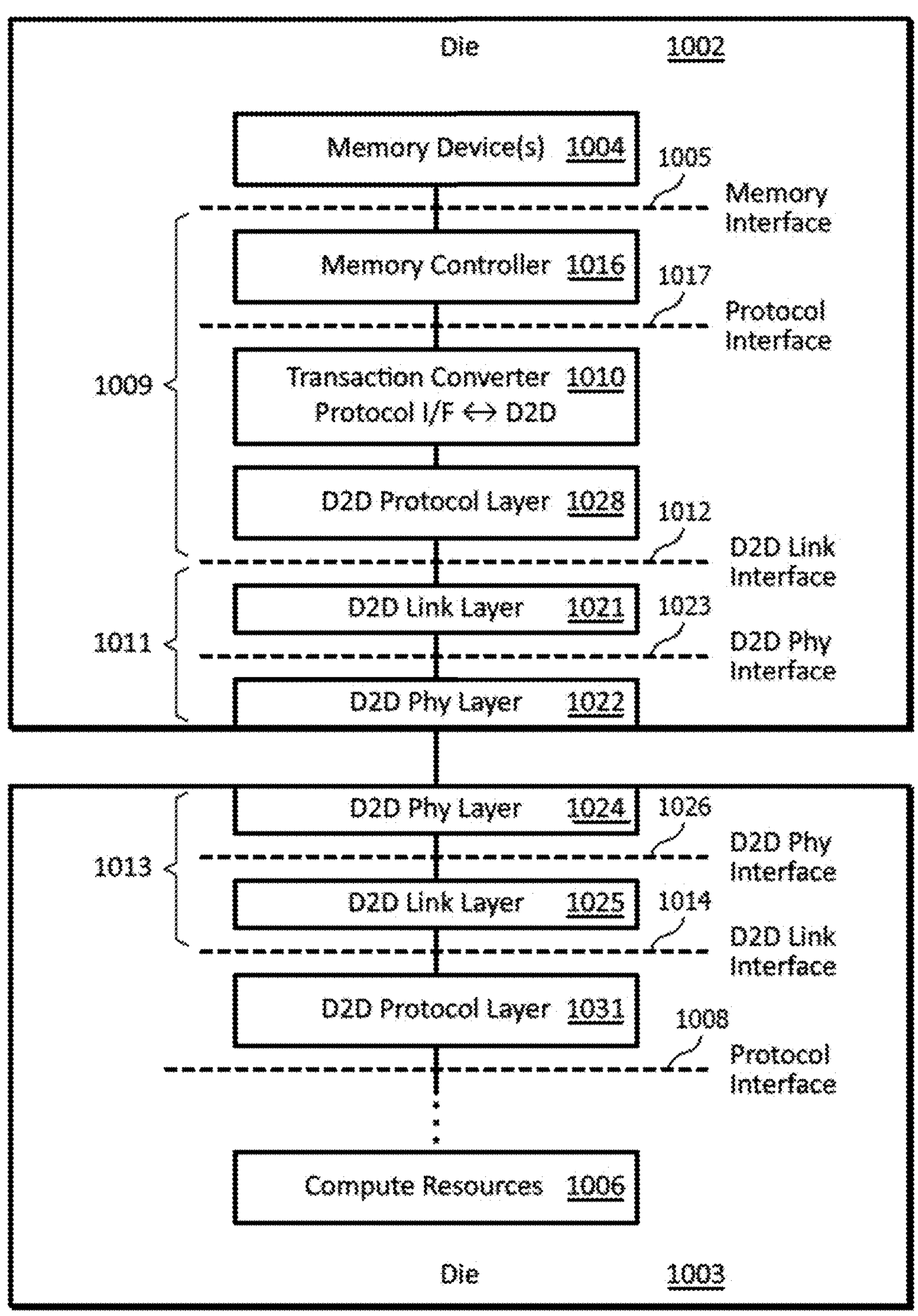
FIG. 10 illustrates an example embodiment of a memory access scheme that may include a memory controller and a protocol layer on a die with one or more memory devices in accordance with example embodiments of the disclosure.

FIG. 10 illustrates an example embodiment of a memory access scheme that may include a memory controller and a protocol layer on a die with one or more memory devices in accordance with example embodiments of the disclosure. The embodiment illustrated in FIG. 10 may be implemented with, or be used to implement, for example, the embodiments illustrated in FIG. 5 and FIG. 8 in which similar elements may be indicated by reference indicators ending in, and/or containing, the same digits, letters, and/or the like.

Figure 10A:
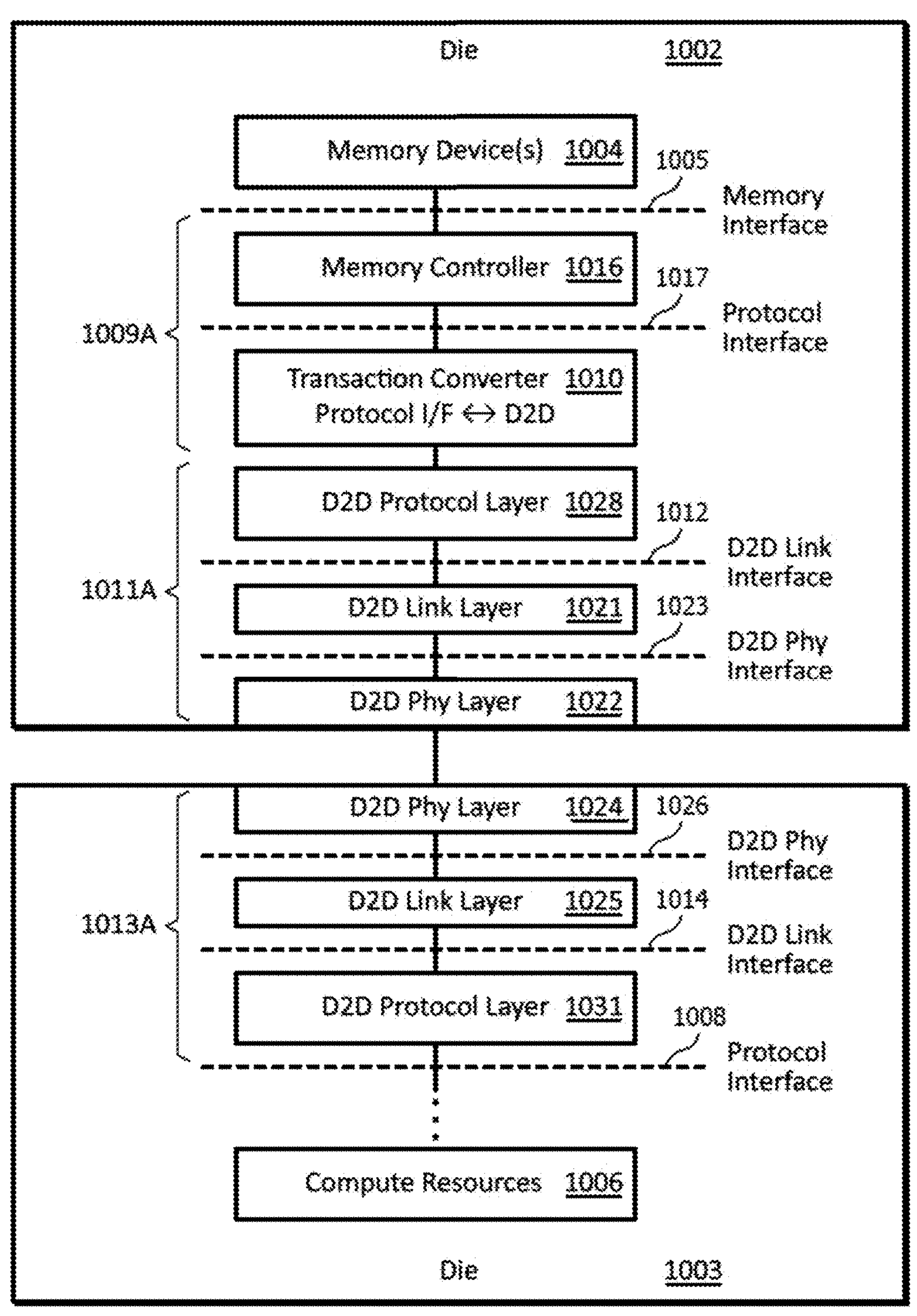
FIG. 10A illustrates an example embodiment of a memory access scheme that may include a memory controller and a protocol layer that may be implemented as a layer of a D2D circuit on a die with one or more memory devices in accordance with example embodiments of the disclosure.

In the embodiment illustrated in FIG. 10, the first die 1002 may include a protocol layer 1028 that may be implemented, for example, using protocol logic such as protocol logic 415 illustrated in FIG. 4. In some embodiments, the protocol layer 1028 may be implemented as a layer of the D2D circuit 1011A illustrated in FIG. 10A. In some embodiments, the transaction converter 1010 may be omitted, for example, if the protocol used by the protocol layer 1028 is the same as, or compatible with, the protocol interface 1017.

In the embodiment illustrated in FIG. 10, the second die 1003 may include a protocol layer 1031 that may implement a protocol and/or protocol interface 1008 that may be the same as, or compatible with, a protocol used by the protocol layer 1028 on the second die 1002. In some embodiments, the protocol layer 1031 may be implemented as a layer of the D2D circuit 1013A illustrated in FIG. 10A.

Figure 11:
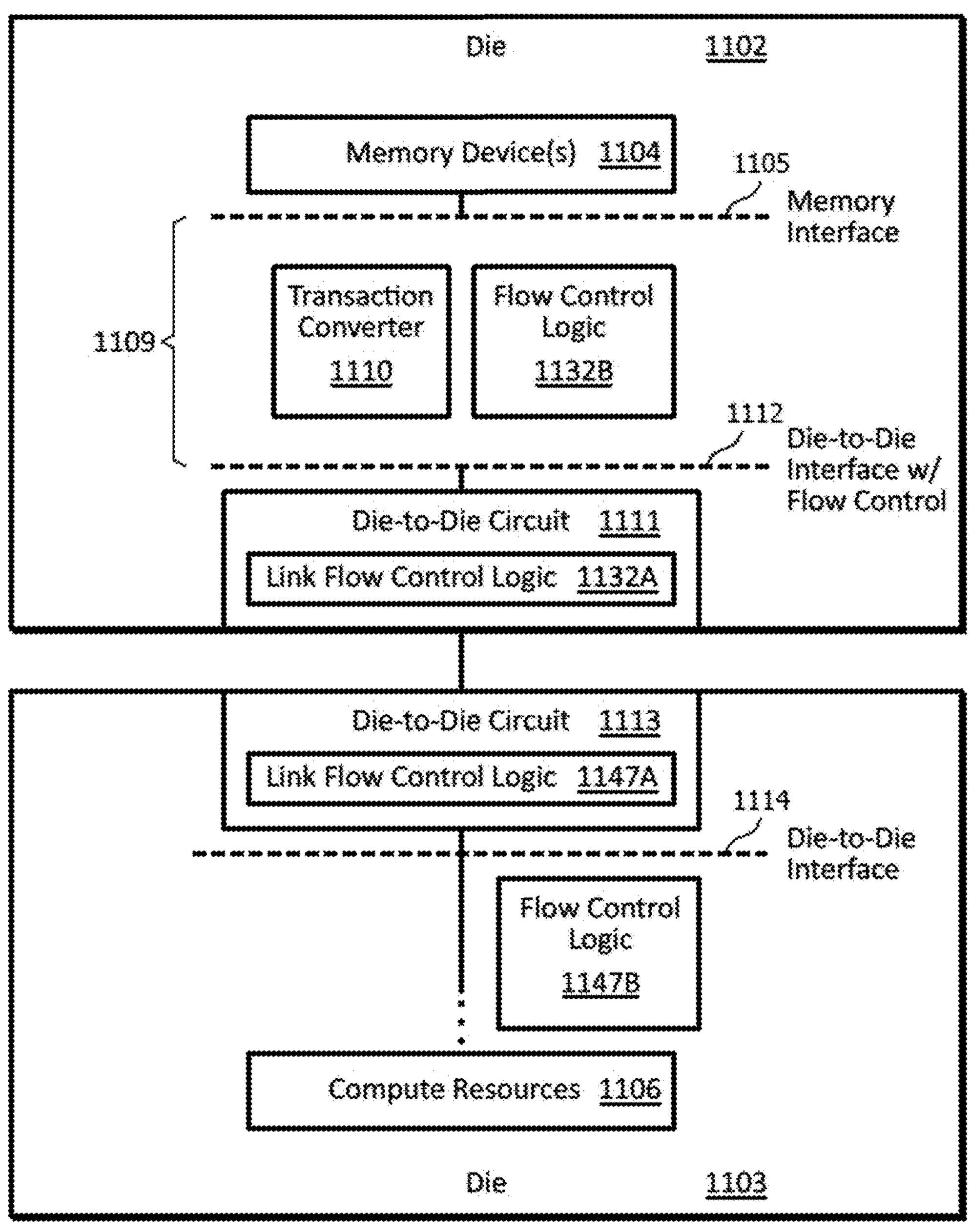
FIG. 11 illustrates an embodiment of a memory access scheme that may use flow control with a D2D interface in accordance with example embodiments of the disclosure.

FIG. 11 illustrates an embodiment of a memory access scheme that may use flow control with a D2D interface in accordance with example embodiments of the disclosure. The embodiment illustrated in FIG. 11 may be implemented with, or be used to implement, for example, the embodiment illustrated in FIG. 3 in which similar elements may be indicated by reference indicators ending in, and/or containing, the same digits, letters, and/or the like.

The embodiment illustrated in FIG. 11 may include flow control logic to implement flow control for data transfers between die 1102 and die 1103. For example, die 1102 may include link flow control logic 1132A in the D2D circuit 1111 and/or flow control logic 1132B in the intermediate section 1109. As another example, die 1103 may include link flow control logic 1147A in the D2D circuit 1113 and/or flow control logic 1147B.

In some embodiments, flow control may be implemented using various flow control features such as credit mechanisms, flow control units (e.g., flits), and/or the like. In an example embodiment using flits, the transaction converter 1110 and/or flow control logic 1132B may convert one or more transactions between the memory interface 1105 and a flit format used by the D2D interface 1112. For example, the transaction converter 1110 and/or flow control logic 1132B may pack one or more transactions from the memory interface 1105 into one or more flits that the D2D circuits 1111 and 1113 may transfer from die 1102 to die 1103 where flow control logic 1147B (and/or other logic such as one or more transaction converters) may unpack the one or more flits to reconstruct the one or more transactions from the memory interface 1105. As another example, flow control logic 1147B may pack one or more transactions into one or more flits that the D2D circuits 1111 and 1113 may transfer from die 1103 to die 1102 where transaction converter 1110 and/or flow control logic 1132B may unpack the one or more flits to reconstruct the one or more transactions to send to the memory interface 1105. In some embodiments, a flit may be implemented with one or more headers that may include information such as a protocol identifier, a stack identifier, a sequence number, data stream control information, acknowledge (ACK) and/or negative acknowledge (NACK), and/or the like.

In other example embodiments, flow control may be implemented at a link layer level by link flow control logic 1132A and/or link flow control logic 1147A. In further example embodiments, flow control may be implemented at die 1102 by a combination of link flow control logic 1132A and flow control logic 1132B, and/or flow control may be implemented at die 1103 by a combination of link flow control logic 1147A and flow control logic 1147B. In some embodiments, some or all of flow control logic 1132B and/or flow control logic 1147B may be implemented as part of a protocol layer at die 1102 and/or 1103, respectively.

Depending on the implementation details, using flow control for the D2D circuit 1111 and/or the D2D interface 1112 may reduce latency, for example, by eliminating a protocol layer and/or associated apparatus from the first die 1102 and/or the second die 1103.

Figure 12:
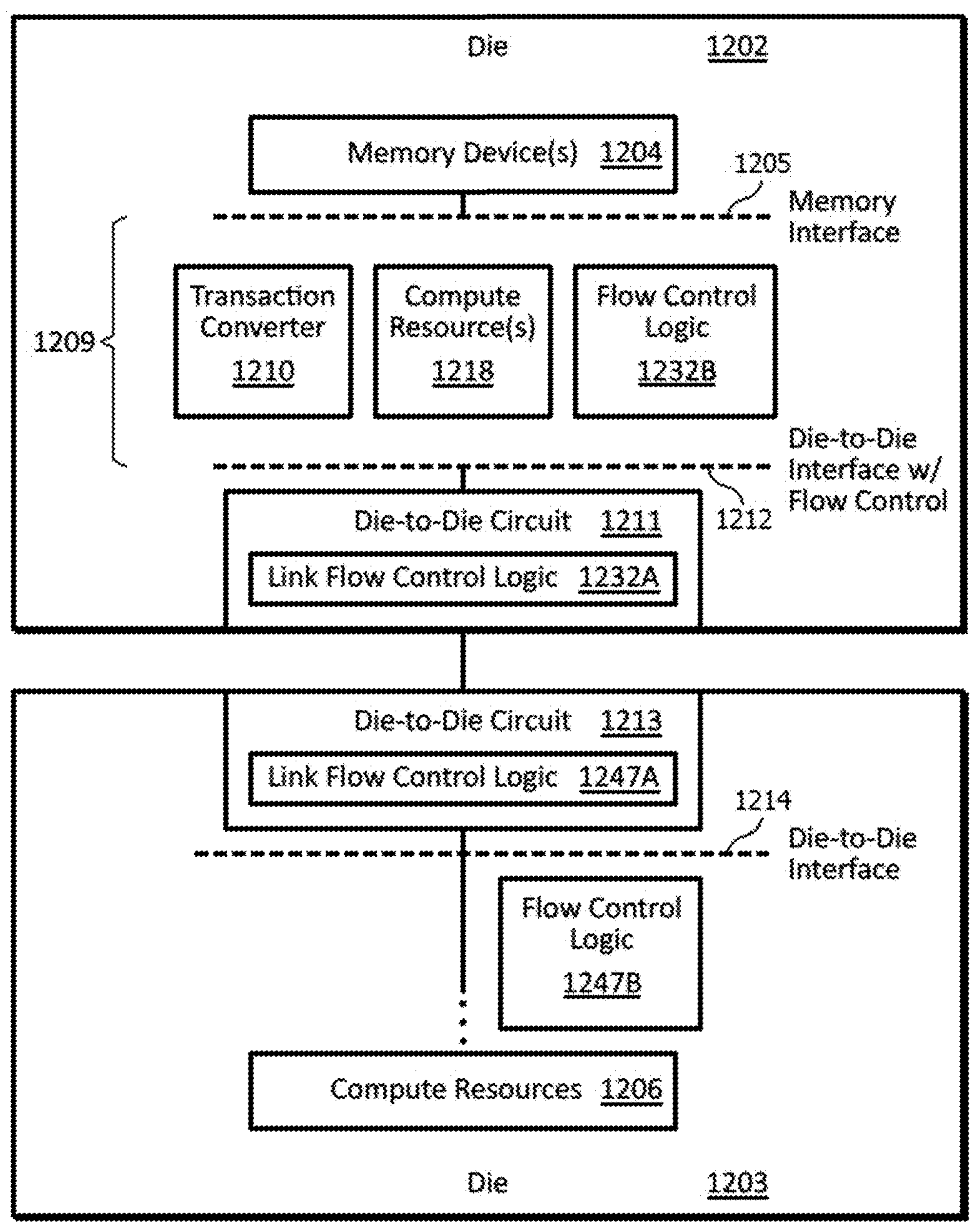
FIG. 12 illustrates an embodiment of a memory access scheme that may include one or more compute resources and/or use flow control with a D2D interface in accordance with example embodiments of the disclosure.

FIG. 12 illustrates an embodiment of a memory access scheme that may include one or more compute resources and/or use flow control with a D2D interface in accordance with example embodiments of the disclosure. The embodiment illustrated in FIG. 12 may be implemented with, or be used to implement, for example, the embodiments illustrated in FIG. 3 and/or FIG. 11 in which similar elements may be indicated by reference indicators ending in, and/or containing, the same digits, letters, and/or the like.

In the embodiment illustrated in FIG. 12, the intermediate section 1209 may include one or more compute resources 1218 (which in some embodiments may be implemented at least partially with an NOC), examples of which are described with respect to the embodiment illustrated in FIG. 6.

In some embodiments, at least a portion of the one or more compute resources 1218 may be implemented with resources that may enable one or more operations that may otherwise be performed by the compute resources 1206 at the second die 1203 (e.g., a compute die) to be performed at the first die 1202 (e.g., a buffer die). Thus, one or more compute operations may be offloaded from the second die 1203 to the first die 1202. Depending on the implementation details, this may reduce the latency, power consumption, and/or the like, associated with performing an operation, for example, by reducing or eliminating the transfer of data between the first die 1202 and the second die 1203.

Figure 13:
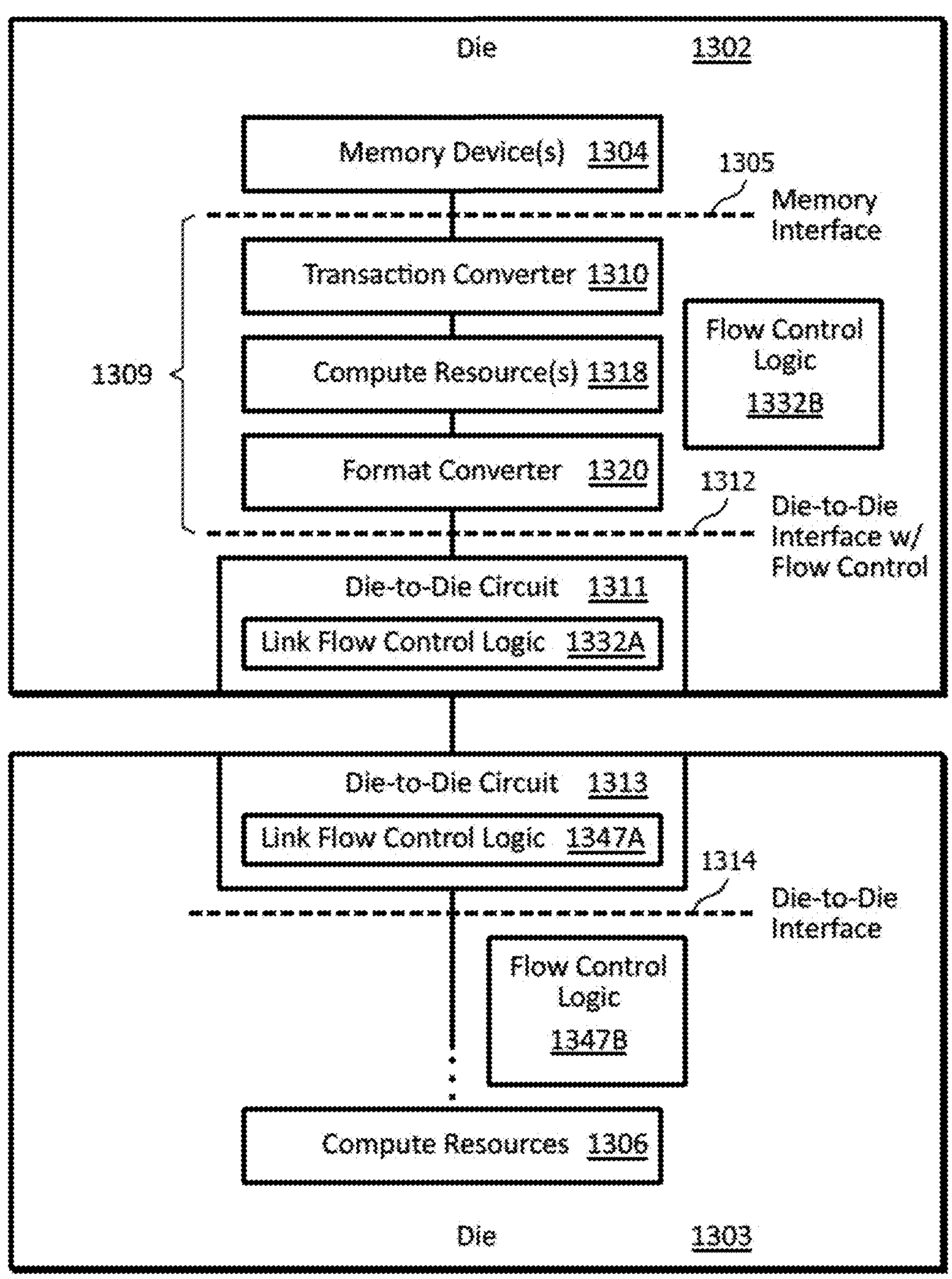
FIG. 13 illustrates an example embodiment of a memory access scheme that may include one or more compute resources and use flow control in accordance with example embodiments of the disclosure.

FIG. 13 illustrates an example embodiment of a memory access scheme that may include one or more compute resources and use flow control in accordance with example embodiments of the disclosure. The embodiment illustrated in FIG. 13 may be implemented with, or be used to implement, for example, the embodiments illustrated in FIG. 11 and/or FIG. 12 in which similar elements may be indicated by reference indicators ending in, and/or containing, the same digits, letters, and/or the like.

The embodiment illustrated in FIG. 13 may include a transaction converter 1310, one or more compute resources 1318, and/or a format converter 1320. The transaction converter 1310 may convert one or more transactions between a format used for the memory interface 1305 and a format used by the one or more compute resources 1318 (which in some embodiments may be implemented at least partially with an NOC). The format converter 1320, which may be implemented, for example, as a transaction converter, may convert one or more signals between a format used by the one or more compute resources 1318 and a format used by the D2D interface with flow control 1312.

Figure 14:
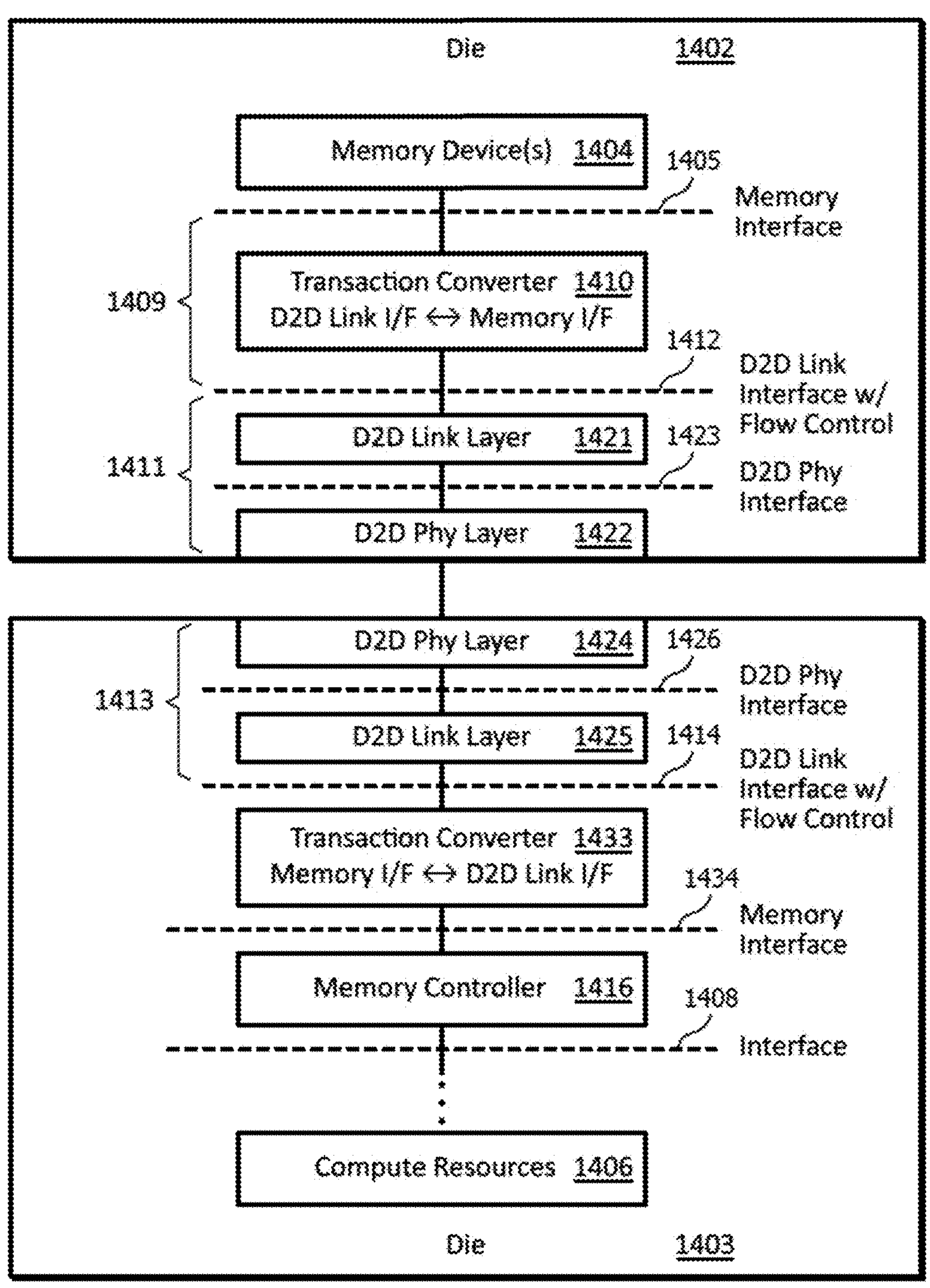
FIG. 14 illustrates an example embodiment of a memory access scheme that may use flow control in accordance with example embodiments of the disclosure.

FIG. 14 illustrates an example embodiment of a memory access scheme that may use flow control in accordance with example embodiments of the disclosure. The embodiment illustrated in FIG. 14 may be implemented with, or be used to implement, for example, the embodiment illustrated in FIG. 11 in which similar elements may be indicated by reference indicators ending in, and/or containing, the same digits, letters, and/or the like.

In the embodiment illustrated in FIG. 14, the first D2D circuit 1411 may be implemented with a phy layer 1422 that may implement a D2D phy interface 1423 and/or a link layer 1421 that may implement a D2D link interface 1412 with flow control. The second D2D circuit 1413 may be implemented with a phy layer 1424 that may implement a D2D phy interface 1426 and/or a link layer 1425 that may implement a D2D link interface 1414 with flow control, In some embodiments, either or both of the first D2D circuit 1411 and/or the second D2D circuit 1413 may implement flow control logic, for example, at D2D link layers 1421 and/or 1425, respectively. In some embodiments, one or more of the intermediate section 1409 and/or D2D circuit 1411 may implement flow control logic such as the flow control logic 1332B and/or link flow control logic 1332A illustrated in FIG. 13. In some embodiments, one or more of the D2D circuit 1413 and/or other components at die 1403 may implement flow control logic such as the flow control logic 1347B and/or link flow control logic 1347A illustrated in FIG. 13.

The transaction converter 1410 on the first die 1402 may convert one or more transactions between a format used by the memory interface 1405 and a format used by the D2D link interface 1412 of the D2D link layer 1421. The transaction converter 1433 on the second die 1403 may convert one or more transactions between a format used by the D2D link layer 1425 and a format used by a memory interface 1434 of a memory controller 1416 located on the second die 1403. In some embodiments, one or both of the transaction converter 1410 and/or transaction converter 1433 may be implemented, for example, with a circuit design that may perform transaction conversions in a manner that may reduce latency, for example, by eliminating a protocol layer and/or associated apparatus from the first die 1402 and/or the second die 1403.

In some embodiments, the second die 1403 may include one or more memory controllers 1416, for example, a memory controller per memory channel and/or D2D circuit 1413.

In some embodiments, a link layer such as 1421 and/or 1425 may implement one or more data reliability features such as error detection (e.g., cyclic redundancy check (CRC)), retry, and/or the like.

Figure 15:
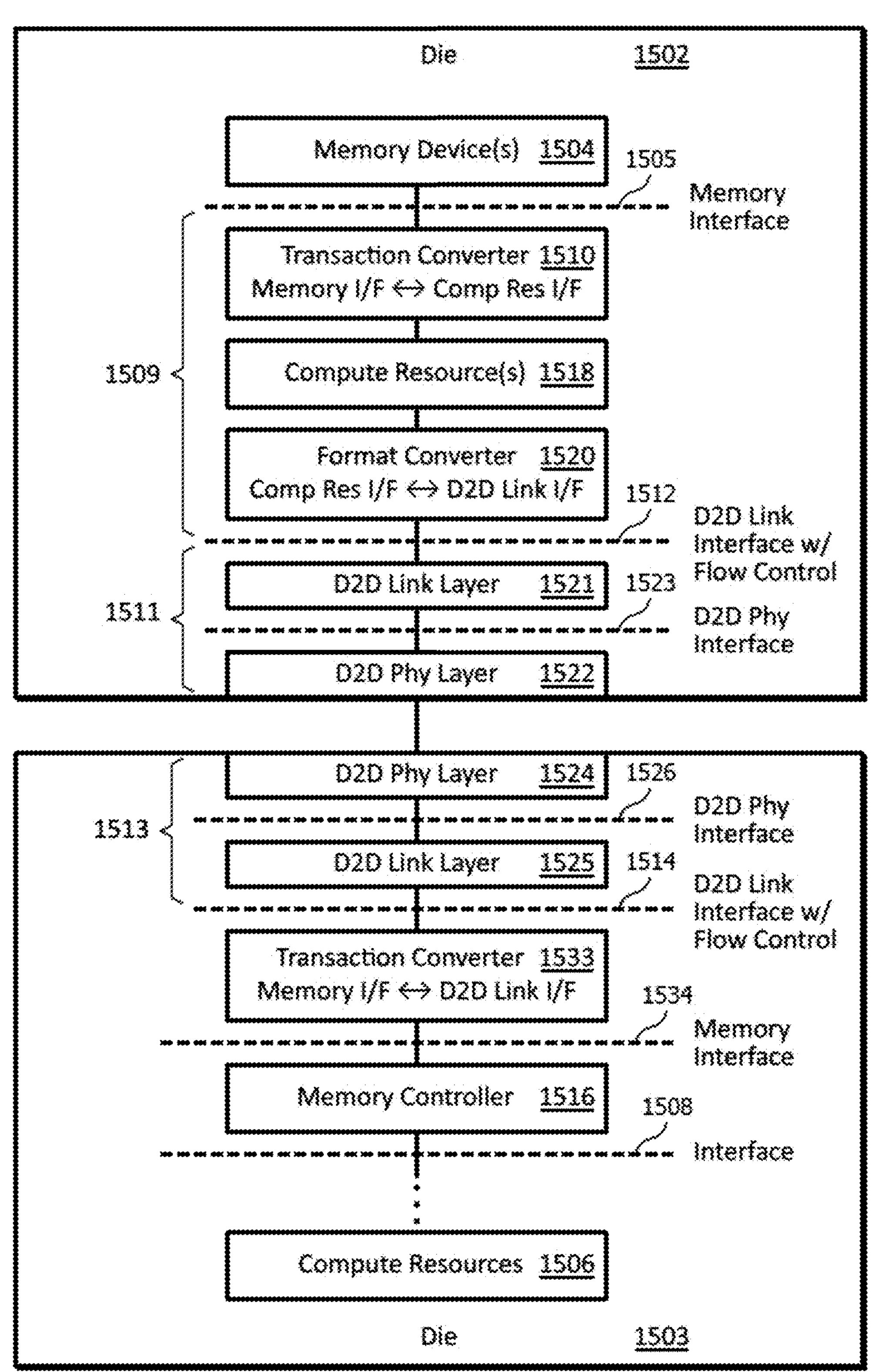
FIG. 15 illustrates an example embodiment of a memory access scheme that may include one or more compute resources in accordance with example embodiments of the disclosure.

FIG. 15 illustrates an example embodiment of a memory access scheme that may include one or more compute resources in accordance with example embodiments of the disclosure. The embodiment illustrated in FIG. 15 may be implemented with, or be used to implement, for example, the embodiment illustrated in FIG. 12 and/or FIG. 13 in which similar elements may be indicated by reference indicators ending in, and/or containing, the same digits, letters, and/or the like.

The embodiment illustrated in FIG. 15 may include one or more compute resources 1518 (which in some embodiments may be implemented at least partially with an NOC), The first D2D circuit 1511 may be implemented with a phy layer 1522 that may implement a D2D phy interface 1523 and/or a link layer 1521 that may implement a D2D link interface 1512 with flow control. The second D2D circuit 1513 may be implemented with a phy layer 1524 that may implement a D2D phy interface 1526 and/or a link layer 1525 that may implement a D2D link interface 1514 with flow control.

In some embodiments, either or both of the first D2D circuit 1511 and/or second D2D circuit 1513 may implement flow control logic, for example, at D2D link layers 1521 and/or 1525, respectively. In some embodiments, one or more components of the intermediate section 1509 and/or die 1503 may implement flow control logic such as flow control logic 1332B and/or 1347B, respectively.

The transaction converter 1510 on the first die 1502 may convert one or more transactions between a format used by the memory interface 1505 and a format used by the one or more compute resources 1518. The format converter 1520, which may be implemented, for example, as a transaction converter, may convert one or more signals between a format used by the one or more compute resources 1518 and a format used by the D2D link interface 1512 of the D2D link layer 1521. The transaction converter 1533 on the second die 1503 may convert one or more transactions between a format used by the D2D link layer 1525 and a format used by an interface 1508 and/or corresponding protocol and/or any other format that may be used by the second die 1503.

Figure 16:
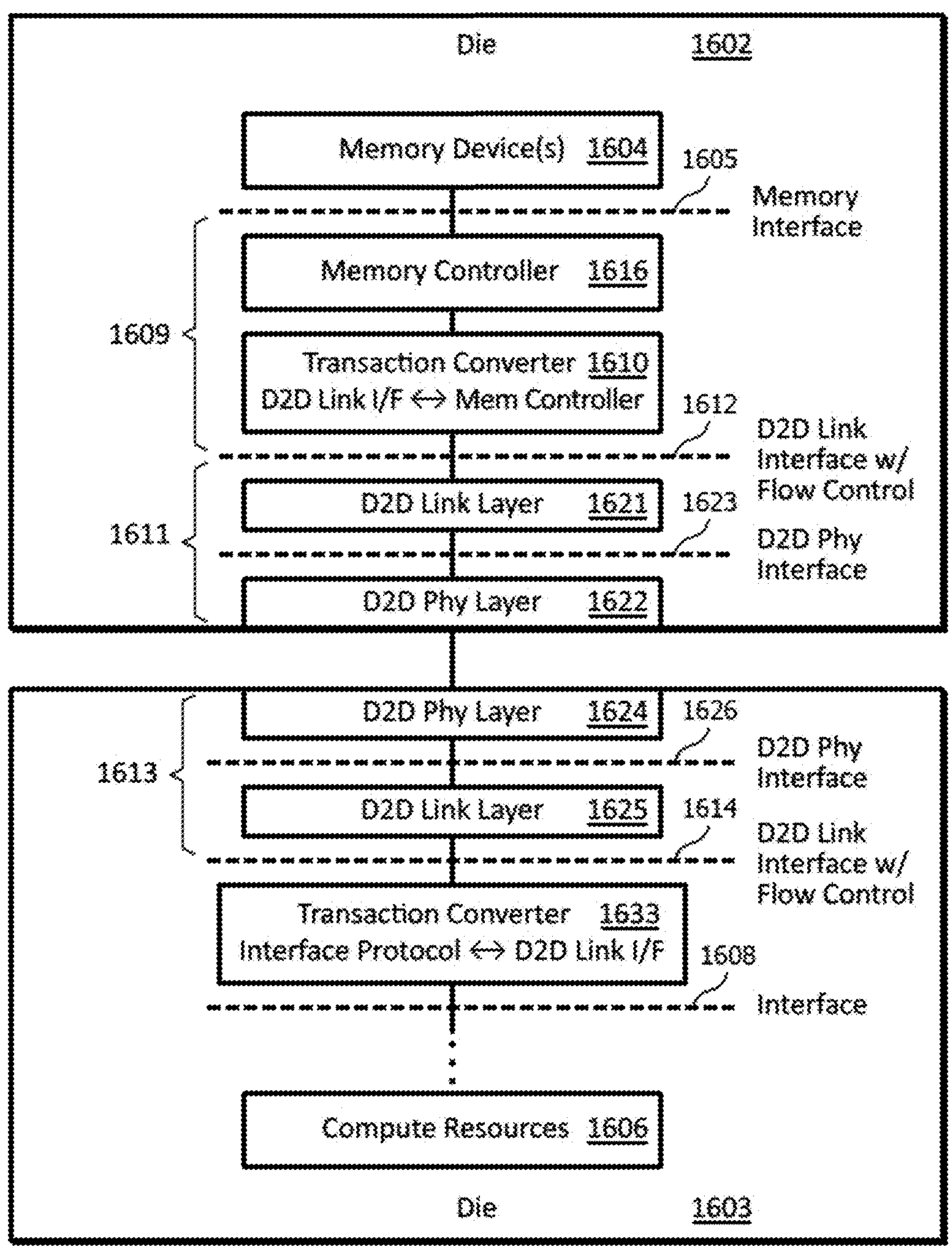
FIG. 16 illustrates an example embodiment of a memory access scheme that may include a memory controller on a die with one or more compute resources and use flow control for a D2D interface in accordance with example embodiments of the disclosure.

In some embodiments, one or more of the transaction converter 1510, format converter 1520, and/or transaction converter 1533 may be implemented, for example, with a circuit design that may perform transaction and/or format conversions in a manner that may reduce latency, for example, by eliminating a protocol layer and/or associated apparatus from the first die 1502 and/or the second die 1503, FIG. 16 illustrates an example embodiment of a memory access scheme that may include a memory controller on a die with one or more compute resources and use flow control for a D2D interface in accordance with example embodiments of the disclosure. The embodiment illustrated in FIG. 16 may be implemented with, or be used to implement, for example, the embodiment illustrated in FIG. 14 in which similar elements may be indicated by reference indicators ending in, and/or containing, the same digits, letters, and/or the like.

The embodiment illustrated in FIG. 16, may include a memory controller 1616 on the first die 1602. The first D2D circuit 1611 may be implemented with a phy layer 1622 that may implement a D2D phy interface 1623 and/or a link layer 1621 that may implement a D2D link interface 1612 with flow control. The second D2D circuit 1613 may be implemented with a phy layer 1624 that may implement a D2D phy interface 1626 and/or a link layer 1625 that may implement a D2D link interface 1614 with flow control.

In some embodiments, either or both of the first D2D circuit 1611 and/or the second D2D circuit 1613 may implement flow control logic, for example, at D2D link layers 1621 and/or 1625, respectively. Additionally, or alternatively, one or more of the intermediate section 1609 and/or D2D circuit 1611 may implement flow control logic such as the flow control logic 1332B and/or link flow control logic 1332A illustrated in FIG. 13. Additionally, or alternatively, one or more of the D2D circuit 1613 and/or other components at die 1603 may implement flow control logic such as the flow control logic 1347B and/or link flow control logic 1347A illustrated in FIG. 13.

The transaction converter 1610 on the first die 1602 may convert one or more transactions between a format used by the memory controller 1616 and a format used by the D2D link interface 1612 of the D2D link layer 1621. The transaction converter 1633 on the second die 1603 may convert one or more transactions between a format used by the D2D link layer 1625 and a format used by an interface 1608 and/or any other format that may be used by the second die 1603.

In some embodiments, one or both of the transaction converter 1610 and/or transaction converter 1633 may be implemented, for example, with a circuit design that may perform transaction conversions in a manner that may reduce latency, for example, by eliminating a protocol layer and/or associated apparatus from the first die 1602 and/or the second die 1603.

In some embodiments, a link layer such as 1621 and/or 1625 may implement one or more data reliability features such as error detection (e.g., cyclic redundancy check (CRC)), retry, and/or the like.

Figure 17:
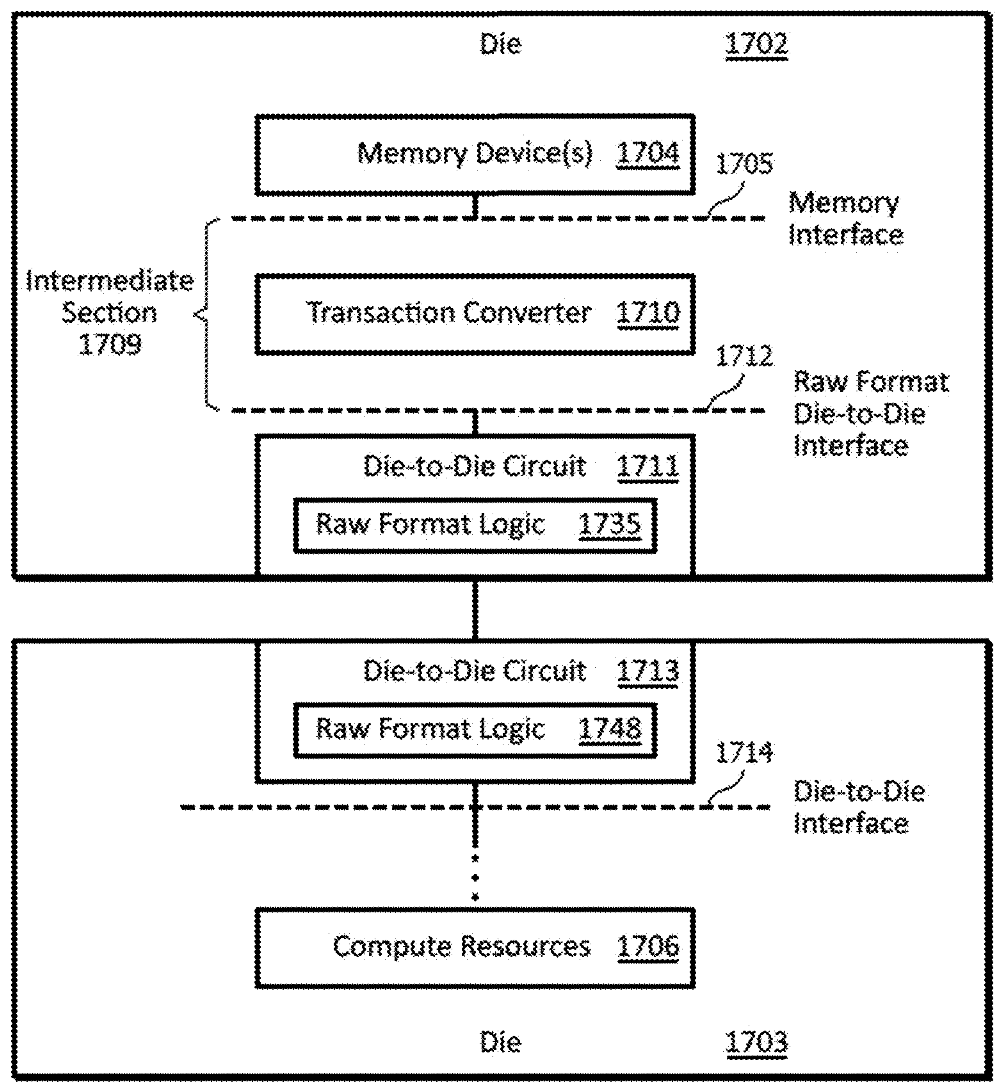
FIG. 17 illustrates an embodiment of a memory access scheme that may use a raw format with a D2D interface in accordance with example embodiments of the disclosure.

FIG. 17 illustrates an embodiment of a memory access scheme that may use a raw format with a D2D interface in accordance with example embodiments of the disclosure. The embodiment illustrated in FIG. 17 may be implemented with, or be used to implement, for example, the embodiment illustrated in FIG. 3 in which similar elements may be indicated by reference indicators ending in, and/or containing, the same digits, letters, and/or the like.

In the embodiment illustrated in FIG. 17, the D2D circuit 1711 may include raw format logic 1735, and/or the D2D interface 1712 may be implemented with a raw format.

Depending on the implementation details, using a raw format for the D2D circuit 1711 and/or the D2D interface 1712 may reduce latency, for example, by bypassing flit formatting and/or by eliminating a link layer and/or associated apparatus from the first die 1702 and/or the second die 1703. Thus, in some embodiments, using a raw format for the D2D circuit 1711 and/or the D2D interface 1712 may enable the elimination of one or more link layers and/or protocol layers, thereby enabling a further reduction in latency.

In some embodiments, the transaction converter 1710 may convert data for one or more transactions for the memory interface 1705 to a raw format that, depending on the implementation details, may improve bandwidth, reduce overhead, and/or the like. For example, in some embodiments, the transaction converter 1710 may pack and/or unpack, data for one or more transactions into and/or from one or more transfer units for a raw format D2D interface 1712. One example of a transfer unit for a raw interface may be a 64-byte raw format for UCIe.

Figure 18:
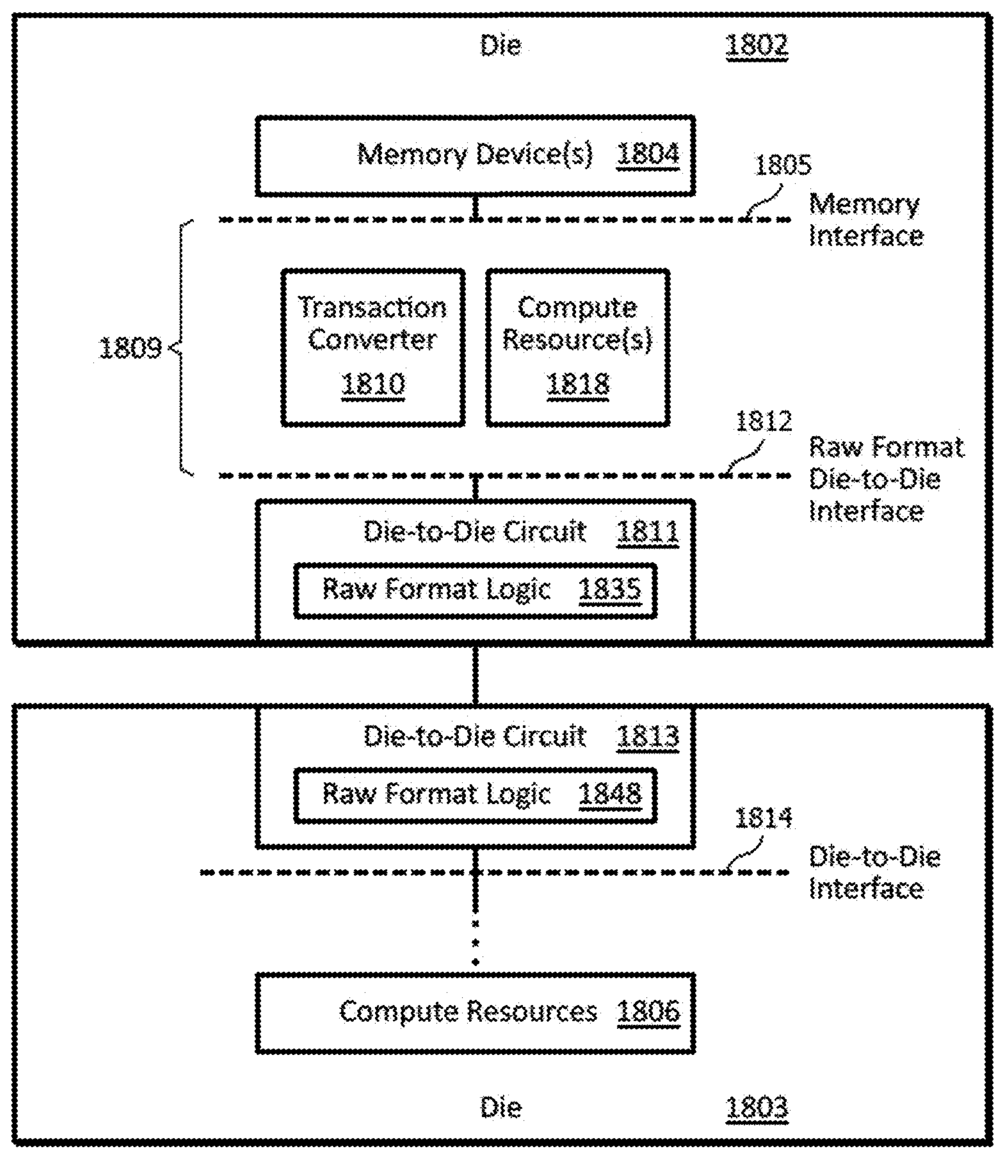
FIG. 18 illustrates an embodiment of a memory access scheme that may include one or more compute resources and/or use a raw format with a D2D interface in accordance with example embodiments of the disclosure.

FIG. 18 illustrates an embodiment of a memory access scheme that may include one or more compute resources and/or use a raw format with a D2D interface in accordance with example embodiments of the disclosure. The embodiment illustrated in FIG. 18 may be implemented with, or be used to implement, for example, the embodiments illustrated in FIG. 3 and/or FIG. 17 in which similar elements may be indicated by reference indicators ending in, and/or containing, the same digits, letters, and/or the like.

In the embodiment illustrated in FIG. 18, the intermediate section 1809 may include one or more compute resources 1818 (which in some embodiments may be implemented at least partially with an NOC), examples of which are described with respect to the embodiment illustrated in FIG. 6.

In some embodiments, at least a portion of the one or more compute resources 1818 may be implemented with resources that may enable one or more operations that may otherwise be performed by the compute resources 1806 at the second die 1803 (e.g., a compute die) to be performed at the first die 1802 (e.g., a buffer die). Thus, one or more compute operations may be offloaded from the second die 1803 to the first die 1802. Depending on the implementation details, this may reduce the latency, power consumption, and/or the like, associated with performing an operation, for example, by reducing or eliminating the transfer of data from the first die 1802 to the second die 1803.

Figure 19:
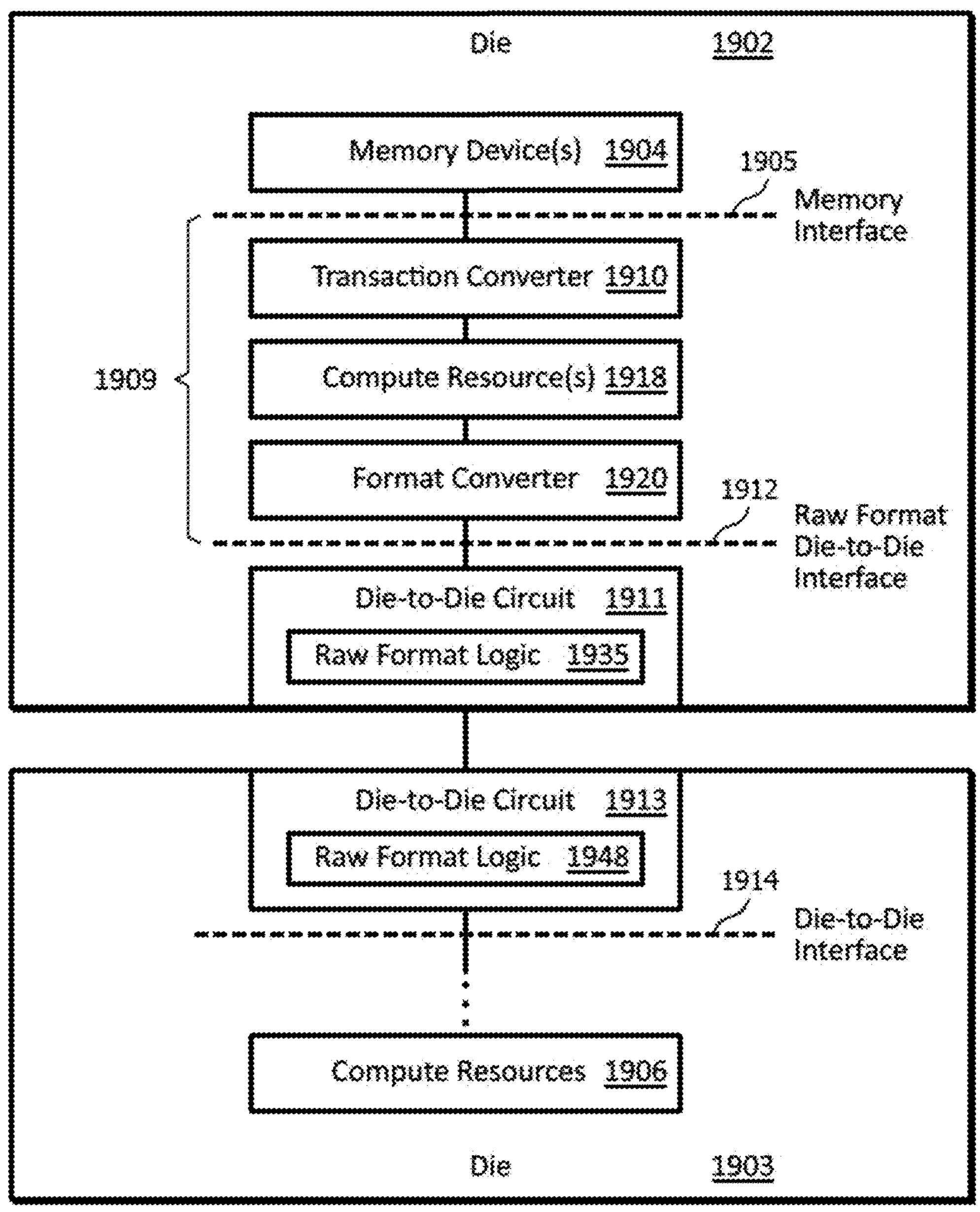
FIG. 19 illustrates an example embodiment of a memory access scheme that may include one or more compute resources and/or use a raw format for a D2D interface in accordance with example embodiments of the disclosure.

FIG. 19 illustrates an example embodiment of a memory access scheme that may include one or more compute resources and/or use a raw format for a D2D interface in accordance with example embodiments of the disclosure. The embodiment illustrated in FIG. 19 may be implemented with, or be used to implement, for example, the embodiments illustrated in FIG. 17 and/or FIG. 18 in which similar elements may be indicated by reference indicators ending in, and/or containing, the same digits, letters, and/or the like.

The embodiment illustrated in FIG. 19 may include a transaction converter 1910, one or more compute resources 1918, and/or a format converter 1920. The transaction converter 1910 may convert one or more transactions between a format used for the memory interface 1905 and a format used by the one or more compute resources 1918 (which in some embodiments may be implemented at least partially with an NOC). The format converter 1920, which may be implemented, for example, as a transaction converter, may convert one or more signals between a format used by the one or more compute resources 1918 and a format used by the raw format D2D interface 1912.

In some embodiments, the format converter 1920 may convert data associated with the one or more compute resources 1918 to and/or form a raw format that, depending on the implementation details, may improve bandwidth, reduce overhead, and/or the like. For example, in some embodiments, the format converter 1920 may pack and/or unpack, data for one or more transactions into and/or from one or more transfer units for a raw format D2D interface 1912. One example of a transfer unit for a raw interface may be a 64-byte raw format for UCIe.

Figure 20:
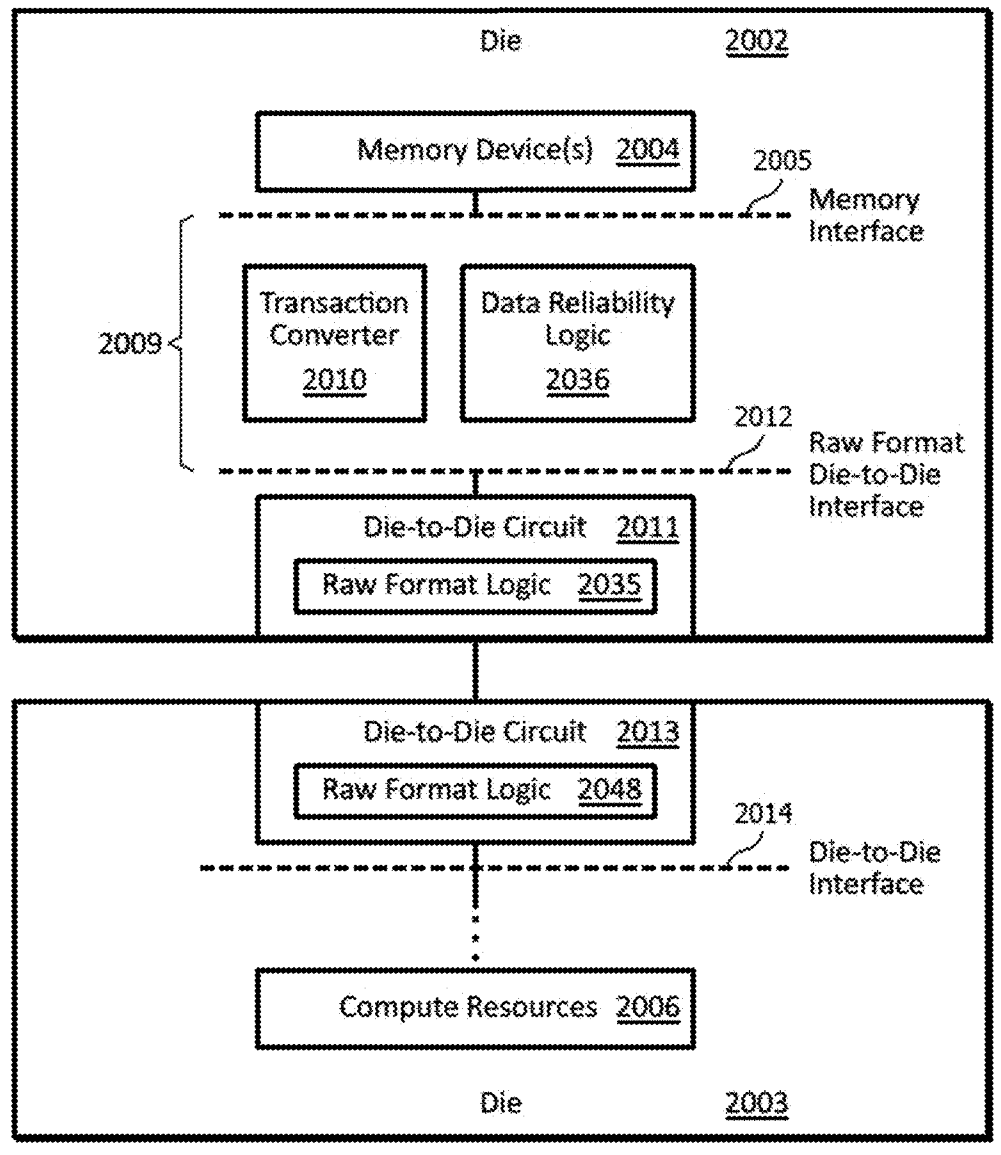
FIG. 20 illustrates an embodiment of a memory access scheme that may include one or more compute resources and/or use a raw format with a D2D interface in accordance with example embodiments of the disclosure.

FIG. 20 illustrates an embodiment of a memory access scheme that may include one or more compute resources and/or use a raw format with a D2D interface in accordance with example embodiments of the disclosure. The embodiment illustrated in FIG. 20 may be implemented with, or be used to implement, for example, the embodiments illustrated in FIG. 3 and/or FIG. 17 in which similar elements may be indicated by reference indicators ending in, and/or containing, the same digits, letters, and/or the like.

In the embodiment illustrated in FIG. 20, the intermediate section 2009 may include data reliability logic 2036 that may implement one or more data reliability features such as error detection (e.g., CRC), error correction (e.g., forward error correction (FEC) such as Hamming codes, convolutional coding, Reed-Solomon (RS) coding, and/or the like), retry, and/or the like.

Figure 21:
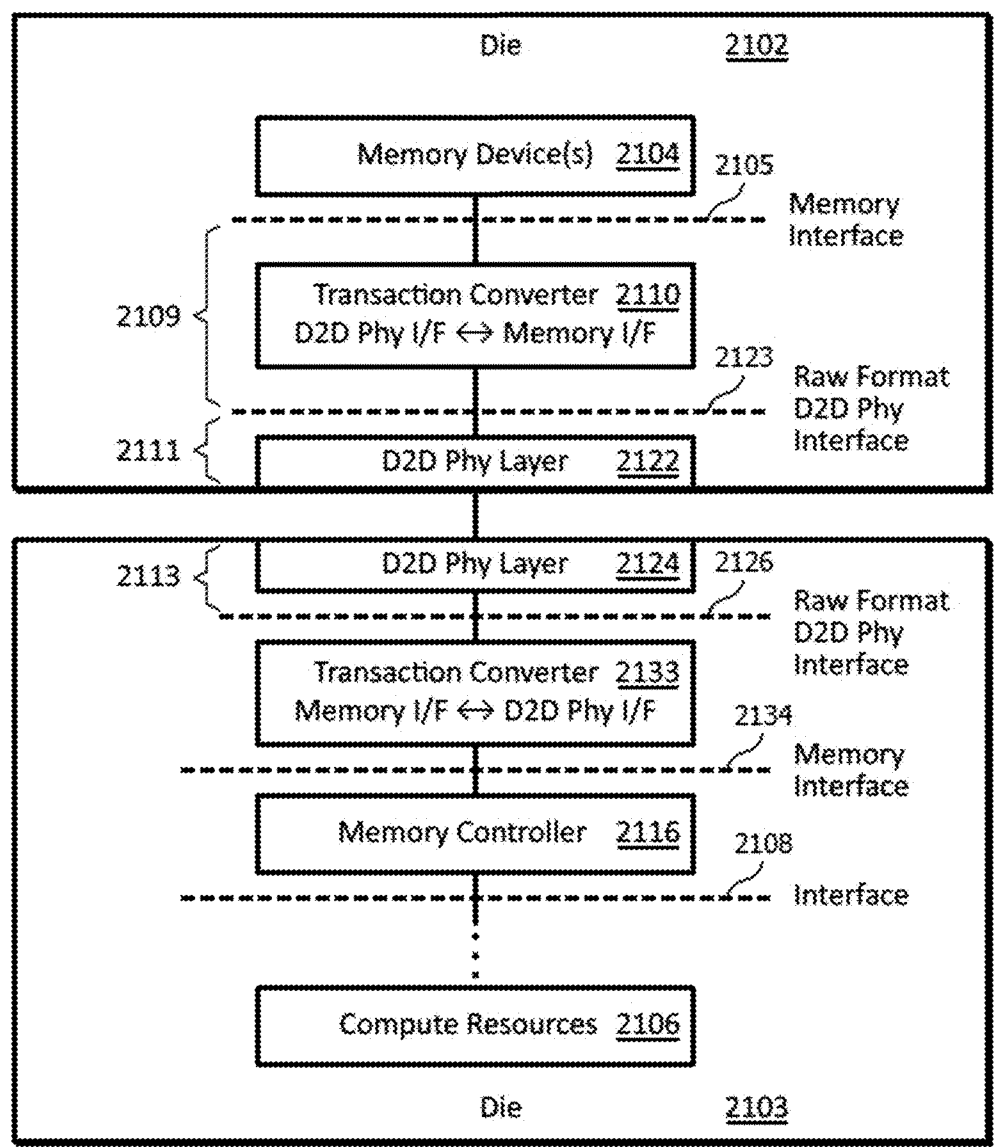
FIG. 21 illustrates an example embodiment of a memory access scheme that may use a raw format for a D2D interface in accordance with example embodiments of the disclosure.

In some embodiments, some or all of the data reliability logic 2036 may be used to implement and/or replace one or more data reliability features that may have been eliminated, for example, by eliminating a protocol layer, a link layer, and/or the like. Depending on the implementation details, the data reliability logic 2036 may implement one or more data reliability features in a manner that may be more efficient, reduce latency, reduce power consumption, and/or the like, compared to one or more similar features being implemented at a protocol layer, a link layer, and/or the like, FIG. 21 illustrates an example embodiment of a memory access scheme that may use a raw format for a D2D interface in accordance with example embodiments of the disclosure. The embodiment illustrated in FIG. 21 may be implemented with, or be used to implement, for example, the embodiment illustrated in FIG. 20 in which similar elements may be indicated by reference indicators ending in, and/or containing, the same digits, letters, and/or the like.

In the embodiment illustrated in FIG. 21, the first D2D circuit 2111 may be implemented with a phy layer 2122 that may implement a raw format D2D phy interface 2123. The second D2D circuit 2113 may be implemented with a phy layer 2124 that may implement a raw format D2D phy interface 2126.

In some embodiments, either or both of the first D2D circuit 2111 and/or the second D2D circuit 2113 may implement raw format logic, for example, at D2D phy layers 2122 and/or 2124, respectively.

The transaction converter 2110 on the first die 2102 may convert one or more transactions between a format used by the memory interface 2105 and a raw format used by the raw format D2D phy interface 2123 of the D2D phy layer 2122. The transaction converter 2133 on the second die 2103 may convert one or more transactions between a raw format used by the D2D phy layer 2124 and a format used by a memory interface 2134 used by a memory controller 2116 at the second die 2103.

In some embodiments, one or both of the transaction converter 2110 and/or transaction converter 2133 may be implemented, for example, with a circuit design that may perform transaction conversions in a manner that may reduce latency, for example, by eliminating a protocol layer, link layer, and/or associated apparatus from the first die 2102 and/or the second die 2103.

In some embodiments, either or both of the first D2D circuit 2111 and/or the second D2D circuit 2113 may implement raw format logic, for example, at D2D phy layers 2122 and/or 2124, respectively.

In some embodiments, the second die 2103 may include one or more memory controllers 2116, for example, a memory controller per memory channel and/or D2D circuit 2113.

Figure 22:
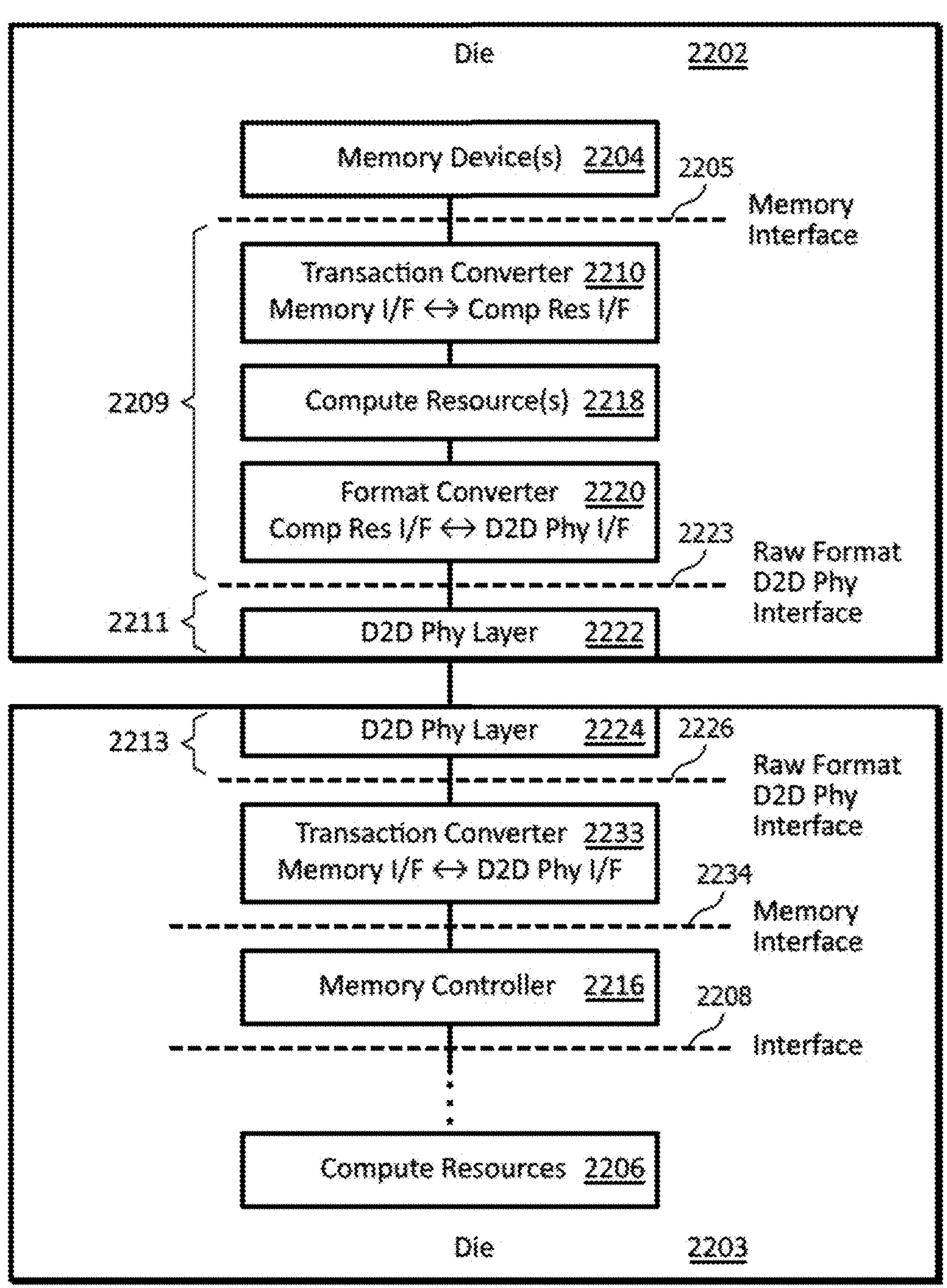
FIG. 22 illustrates an example embodiment of a memory access scheme that may include one or more compute resources and use a raw format for a D2D interface in accordance with example embodiments of the disclosure.

FIG. 22 illustrates an example embodiment of a memory access scheme that may include one or more compute resources and use a raw format for a D2D interface in accordance with example embodiments of the disclosure. The embodiment illustrated in FIG. 22 may be implemented with, or be used to implement, for example, the embodiments illustrated in FIG. 18 and/or FIG. 19 in which similar elements may be indicated by reference indicators ending in, and/or containing, the same digits, letters, and/or the like.

The embodiment illustrated in FIG. 22 may include one or more compute resources 2218 which in some embodiments may be implemented at least partially with an NOC. In the embodiment illustrated in FIG. 22, the first D2D circuit 2211 may be implemented with a phy layer 2222 that may implement a raw format D2D phy interface 2223. The second D2D circuit 2213 may be implemented with a phy layer 2224 that may implement a raw format D2D phy interface 2226.

In some embodiments, either or both of the first D2D circuit 2211 and/or second D2D circuit 2213 may implement raw format logic, for example, at D2D phy layers 2222 and/or 2224, respectively.

The transaction converter 2210 on the first die 2202 may convert one or more transactions between a format used by the memory interface 2205 and a format used by the one or more compute resources 2218. The format converter 2220, which may be implemented, for example, as a transaction converter, may convert one or more signals between a format used by the one or more compute resources 2218 and a raw format used by the D2D link interface 2223 of the D2D phy layer 2222. The transaction converter 2233 on the second die 2203 may convert one or more transactions between a raw format used by the D2D phy layer 2224 and a format used by a memory interface 2234 used by a memory controller 2216 at the second die 2203.

In some embodiments, one or more of the transaction converter 2210, format converter 2220, and/or transaction converter 2233 may be implemented, for example, with a circuit design that may perform transaction conversions in a manner that may reduce latency, for example, by eliminating a protocol layer, link layer, and/or associated apparatus from the first die 2202 and/or the second die 2203.

In some embodiments, the second die 2203 may include one or more memory controllers 2216, for example, a memory controller per memory channel and/or D2D circuit 2213.

Figure 23:
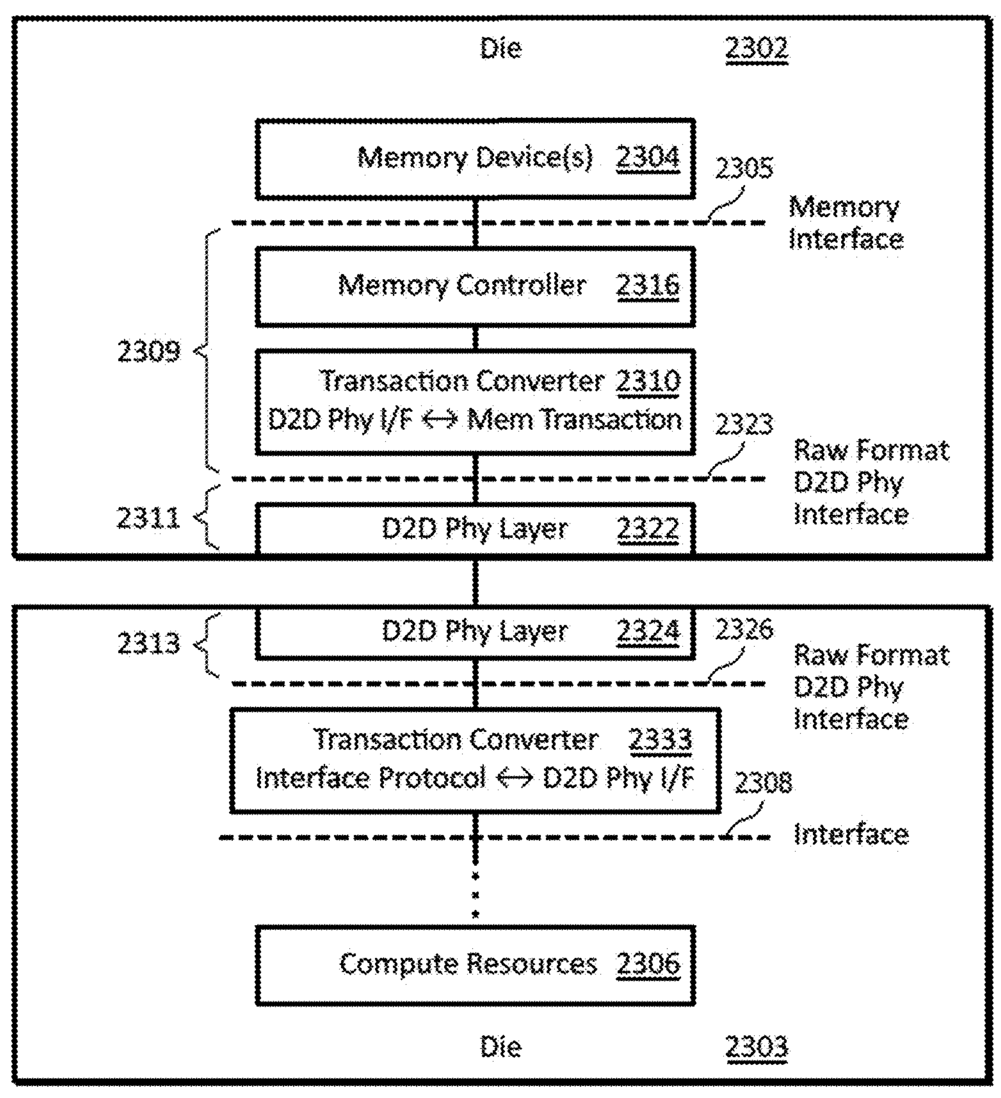
FIG. 23 illustrates an example embodiment of a memory access scheme that may include a memory controller on a die with one or more memory devices and use a raw format for a D2D interface in accordance with example embodiments of the disclosure.

FIG. 23 illustrates an example embodiment of a memory access scheme that may include a memory controller on a die with one or more memory devices and use a raw format for a D2D interface in accordance with example embodiments of the disclosure. The embodiment illustrated in FIG. 23 may be implemented with, or be used to implement, for example, the embodiment illustrated in FIG. 21 in which similar elements may be indicated by reference indicators ending in, and/or containing, the same digits, letters, and/or the like.

The embodiment illustrated in FIG. 23, may include a memory controller 2316 on the first die 2302. The first D2D circuit 2311 may be implemented with a phy layer 2322 that may implement a raw format D2D phy interface 2323. The second D2D circuit 2313 may be implemented with a phy layer 2324 that may implement a raw format D2D phy interface 2326.

In some embodiments, either or both of the first D2D circuit 2311 and/or the second D2D circuit 2313 may implement raw format logic, for example, at D2D phy layers 2322 and/or 2324, respectively.

The transaction converter 2310 on the first die 2302 may convert one or more transactions between a format used by the memory controller 2316 and a raw format used by the D2D phy interface 2323 of the D2D phy layer 2322. The transaction converter 2333 on the second die 2303 may convert one or more transactions between a raw format used by the D2D phy layer 2324 and a format used by an interface 2308 and/or any other format that may be used by the second die 2303.

In some embodiments, one or both of the transaction converter 2310 and/or transaction converter 2333 may be implemented, for example, with a circuit design that may perform transaction conversions in a manner that may reduce latency, for example, by eliminating a protocol layer, a link layer and/or associated apparatus from the first die 2302 and/or the second die 2303.

Figure 24:
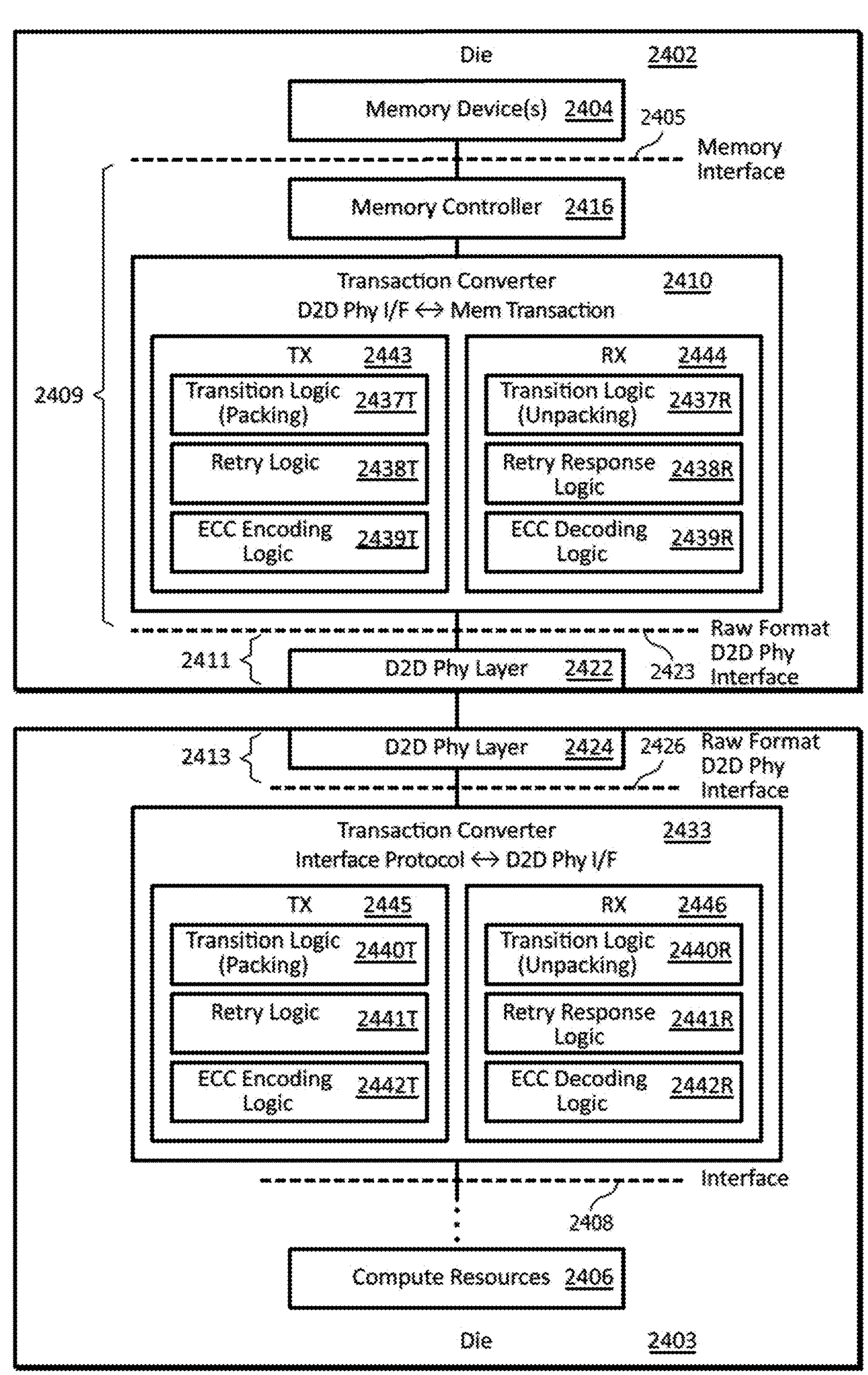
FIG. 24 illustrates an example embodiment of a memory access scheme that may use a raw format for a D2D interface and implement one or more data reliability features in accordance with example embodiments of the disclosure.

FIG. 24 illustrates an example embodiment of a memory access scheme that may use a raw format for a D2D interface and implement one or more data reliability and/or transition features in accordance with example embodiments of the disclosure. The embodiment illustrated in FIG. 24 may be implemented with, or be used to implement, for example, the embodiment illustrated in FIG. 23 in which similar elements may be indicated by reference indicators ending in, and/or containing, the same digits, letters, and/or the like.

The embodiment illustrated in FIG. 24 may include, on the first die 2402, a memory controller 2416 and/or a transaction converter 2410 that may implement one or more features for data reliability (e.g., error detection, error correction, retry, and/or the like), data transition (e.g., packing and/or unpacking), and/or the like.

In some embodiments, the transaction converter 2410 on the first die 2402 may include transmit (TX) logic 2443 and/or receive (RX) logic 2444. In some embodiments, the transaction converter 2433 on the second die 2403 may include transmit logic 2445 and/or receive logic 2446.

The transmit logic 2443 at die 2402 may include one or more of transition logic 2437T (e.g., for packing), retry logic 2438T, and/or error detection and/or error correction logic such as error correction code (ECC) encoding logic 2439T. The receive logic 2444 at die 2402 may include one or more of transition logic 2437R (e.g., for unpacking), retry response logic 2438R, and/or error detection and/or error correction logic such as error correction code (ECC) decoding logic 2439R.

The transmit logic 2445 at die 2403 may include one or more of transition logic 2440T (e.g., for packing), retry logic 2441T, and/or error detection and/or error correction logic such as error correction code (ECC) encoding logic 2442T. The receive logic 2446 at die 2403 may include one or more of transition logic 2440R (e.g., for unpacking), retry response logic 2441R, and/or error detection and/or error correction logic such as error correction code (ECC) decoding logic 2442R.

The embodiment illustrated in FIG. 24 also illustrates some possible implementation details as follows.

The first D2D circuit 2411 may be implemented with a phy layer 2422 that may implement a raw format D2D phy interface 2423. The second D2D circuit 2413 may be implemented with a phy layer 2424 that may implement a raw format D2D phy interface 2426.

In some embodiments, either or both of the first D2D circuit 2411 and/or second D2D circuit 2413 may implement raw format logic, for example, at D2D phy layers 2422 and/or 2424, respectively.

The transaction converter 2410 on the first die 2402 may convert one or more transactions between a format used by the memory controller 2416 and a raw format used by the D2D phy interface 2423 of the D2D phy layer 2422. The transaction converter 2433 on the second die 2403 may convert one or more transactions between a raw format used by the D2D phy layer 2424 and a format used by an interface 2408 and/or any other format that may be used by the second die 2403.

In some embodiments, transition logic 2437T at the first die 2402 and 2440R at the second die 2403 may implement a packing and/or unpacking scheme to implement flow control through the D2D interfaces 2423 and/or 2426. For example, transition logic 2437T may pack one or more memory transactions and/or other data from memory controller 2416 into one or more flits and/or other transfer units that may be transferred, using D2D circuits 2411 and 2413, from die 2402 to die 2403 where transition logic 2440R may unpack the one or more flits and/or other transfer units to reconstruct the one or more memory transactions and/or other data. In some embodiments, a packing process may be reversed with transition logic 2440T at die 2403 packing memory transactions and/or other data from interface 2408 into one or more flits and/or other transfer units that may be transferred from die 2403 to die 2402 where transition logic 2437R may unpack the one or flits and/or other transfer units to reconstruct the memory transactions and/or other data.

In some embodiments, retry logic 2438T at the first die 2402 and retry response logic 2441R at the second die 2403 may implement a retry feature, for example, based on detecting an error (e.g., using a CRC technique) in data sent from the first die 2402 to the second die 2403. In some embodiments, retry logic 2441T at the second die 2403 and retry response logic 2438R at the first die 2403 may implement a retry feature, for example, based on detecting an error (e.g., using a CRC technique) in data sent from the second die 2403 to the first die 2402. In some embodiments, retry response logic 2441R and/or 2438R may be implemented with a checker and/or a credit response function.

In some embodiments, error correction logic such as ECC encoding logic 2439T at the first die 2402 and ECC decoding logic 2442R at the second die 2403 may implement an error correction scheme for data transferred from the first die 2402 and the second die 2403 using D2D circuits 2411 and 2413, respectively. For example, the ECC encoding logic 2439T may implement an FEC encoder (e.g., using Hamming codes, convolutional coding, Reed-Solomon (RS) coding, and/or the like) to encode data sent from the first die 2402 to the second die 2403 where ECC decoding logic 2442R may implement an FEC decoder to decode the encoded data and restore the original data. In some embodiments, encoding may operate in the reverse direction with BCC encoding logic 2442T encoding data at the second die 2403 and ECC decoding logic 2439R decoding the data at the first die 2402.

In some embodiments, some or all of the transition logic 2437T, 2437R, 2440T, and/or 2440R, may be used to implement and/or replace one or more data transition features (e.g., packing and/or unpacking) that may have been eliminated, for example, by eliminating a protocol layer, a link layer, and/or the like. Depending on the implementation details, some or all of the transition logic 2437T, 2437R, 2440T, and/or 2440R, may implement one or more data transition features in a manner that may be more efficient, reduce latency, reduce power consumption, and/or the like, compared to one or more similar features being implemented at a protocol layer, a link layer, and/or the like, In some embodiments, some or all of the retry and/or retry response logic 2438T, 2438R, 2441T, and/or 2441R, may be used to implement and/or replace one or more retry features that may have been eliminated, for example, by eliminating a protocol layer, a link layer, and/or the like. Depending on the implementation details, some or all of the retry and/or retry response logic 2438T, 2438R, 2441T, and/or 2441R, may implement one or more retry features in a manner that may be more efficient, reduce latency, reduce power consumption, and/or the like, compared to one or more similar features being implemented at a protocol layer, a link layer, and/or the like.

In some embodiments, some or all of the error correction logic such as ECC encoding and/or decoding logic 2439T, 2439R, 2442T, and/or 2442R, may be used to implement and/or replace one or more error correction features that may have been eliminated, for example, by eliminating a protocol layer, a link layer, and/or the like. Depending on the implementation details, some or all of the error correction logic such as ECC encoding and/or decoding logic 2439T, 2439R, 2442T, and/or 2442R, may implement one or more error correction features in a manner that may be more efficient, reduce latency, reduce power consumption, and/or the like, compared to one or more similar features being implemented at a protocol layer, a link layer, and/or the like.

FIG. 25 illustrates an embodiment of a memory access scheme that may use one or more compute resources in accordance with example embodiments of the disclosure. The embodiment illustrated in FIG. 25 may be implemented with, or be used to implement any embodiment that may include compute resources on a die with a memory interface and/or one or more memory devices, for example, the embodiments illustrated in FIGS. 3, 6, 7, 9, 12, 13, 15, 18, 19, and/or 22 in which similar elements may be indicated by reference indicators ending in, and/or containing, the same digits, letters, and/or the like.

In the embodiment illustrated in FIG. 25, the intermediate section 2509 may include one or more compute resources 2518 (which in some embodiments may be implemented at least partially with an NOC), examples of which are described with respect to the embodiment illustrated in FIG. 6.

In some embodiments, at least a portion of the one or more compute resources 2518 may be configured in a manner in which data flowing between a memory interface 2505 and a D2D interface 2512 may bypass all or a portion of the one or more compute resources 2518. For example, one or more operations of the one or more compute resources 2518 may use data transferred between the transaction converter 2510 and D2D interface 2512 as shown by the solid line 2549. Additionally, or alternatively, one or more operations of the one or more compute resources 2518 may use data transferred between the transaction converter 2510 and memory interface 2505 as shown by the dotted line 2550. Additionally, or alternatively, an NOC implemented at least partially with the compute resources 1518 may direct data (e.g., using one or more switches, routers, and/or the like) in a manner that may bypass some or all of the compute resources 2518 (e.g., using paths represented by the solid line 2549 and/or dotted line 2550).

Figure 26:
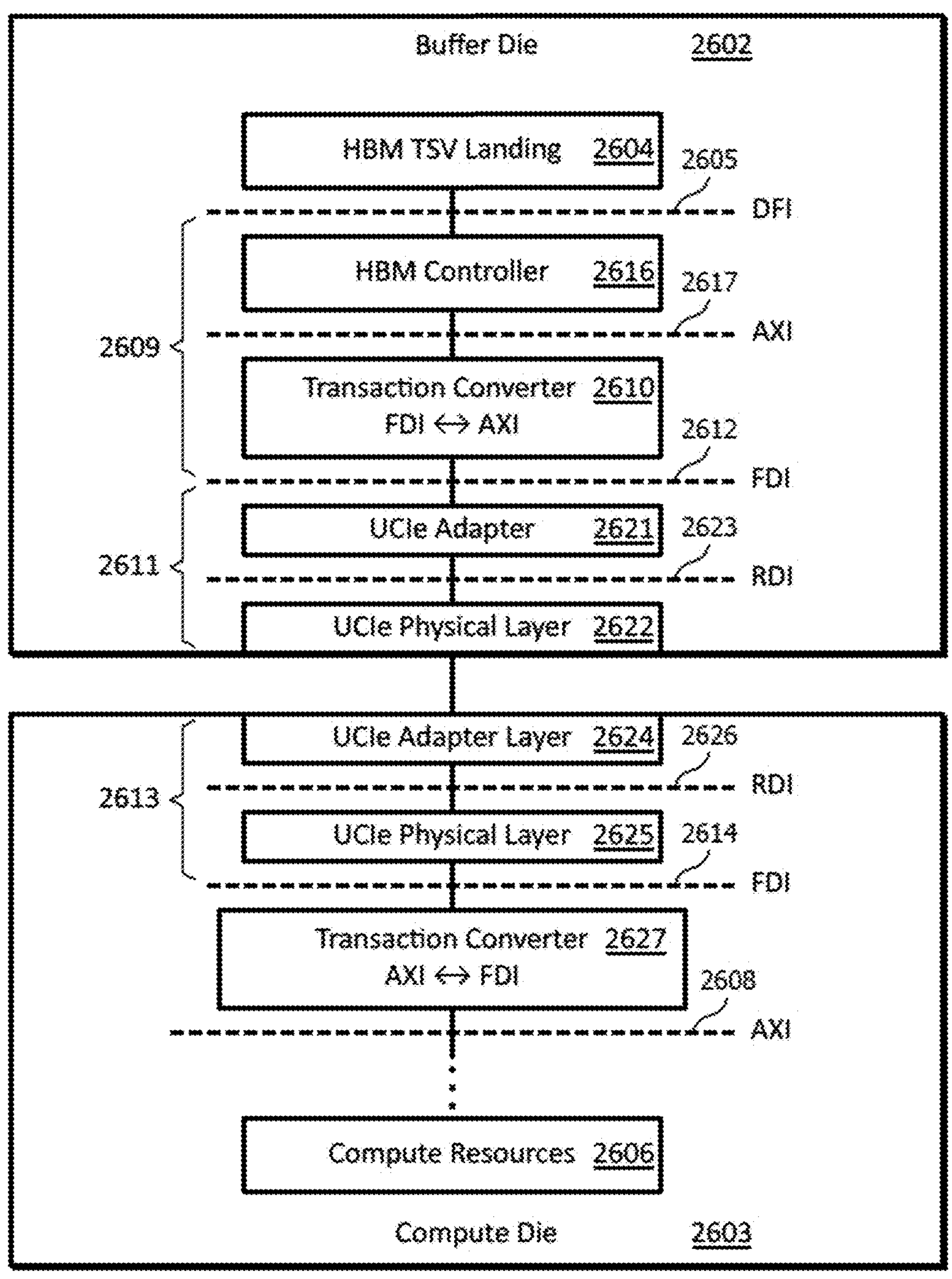
FIG. 26 illustrates an example embodiment of a memory access scheme that may include a memory controller on a die with one or more memory devices in accordance with example embodiments of the disclosure.

FIG. 26 illustrates an example embodiment of a memory access scheme that may include a memory controller on a die with one or more memory devices in accordance with example embodiments of the disclosure. The embodiment illustrated in FIG. 26 may be implemented with, or be used to implement, for example, the embodiment illustrated in FIG. 5 in which similar elements may be indicated by reference indicators ending in, and/or containing, the same digits, letters, and/or the like.

For purposes of providing some example implementation details, the embodiment illustrated in FIG. 26 is shown with some specific types of components, protocols, interfaces, and/or the like. However, the various principles of this disclosure are not limited to these or any other implementation details.

The embodiment illustrated in FIG. 26 may include a buffer die 2602 and a compute die 2603. The D2D circuits 2611 and/or 2613 may include UCIe physical layers 2622 and/or 2624 that may implement raw D2D interfaces (RDIs) 2623 and/or 2626, respectively. The D2D circuits 2611 and/or 2613 may include UCIe adapters 2621 and/or 2625 that may implement flit-aware D2D interfaces (FDIs) 2612 and/or 2614, respectively.

At the buffer die 2602, one or more memory devices may be implemented with an HBM device having a TSV landing 2604 that may implement a DDR PHY Interface (DFI) 2605. The memory controller may be implemented with an HBM controller 2616 that may interface with the TSV landing 2604 through the DFI 2605. The HBM controller 2616 may communicate with the transaction converter 2610 using an AXI protocol through an AXI interface 2617. The transaction converter 2610 may convert one or more memory transactions between the AXI interface 2617 and the FDI 2612.

At the compute die 2603, the transaction converter 2627 may convert the one or more memory transactions between an AXI interface 2608 and the FDI 2614.

Memory access schemes in accordance with example embodiments of the disclosure may implement a variety of component configurations, protocols, formats, data transfer modes, and/or the like, that may provide various potential benefits that may depend on the specific details of any particular application. For example, depending on the implementation details, an embodiment that uses an AXI protocol for an interface between a memory controller on a die with one or more memory devices and a transaction converter may provide improved performance when used with a D2D interface that uses a raw format. As another example, depending on the implementation details, an embodiment that uses a CHI, CXS, and/or CCIX protocol may provide improved performance when used with a D2D interface that uses a flit format to provide flow control. As a further example, depending on the implementation details, an embodiment that uses pulse amplitude modulation 4 (PAM4) signaling may provide improved performance when used with a D2D interface that uses a flit format to provide flow control.

In some embodiments, and depending on the implementation details, one or more memory access schemes in accordance with the disclosure may provide improved scalability. For example, some embodiments using one or more aspects of the disclosure may accommodate increased data traffic and/or workloads, and depending on the implementation details, without reducing memory performance. As another example, some embodiments using one or more aspects of the disclosure may scale up and/or down (e.g., relatively quickly and/or in response to changing memory demands) For instance, in an embodiment in which a compute die is connected through multiple D2D interconnects to multiple buffers dies having memory devices in accordance with example embodiments of the disclosure, one or more of the buffer dies and associated memory devices may be activated and/or deactivated based on demand. As an additional example, some embodiments using one or more aspects of the disclosure may provide enhanced reliability and/or fault tolerance. For instance, some embodiments may implement one or more data reliability features such as retry, error correction, and/or error detection for data transferred using a D2D interface. As a further example, some embodiments using one or more aspects of the disclosure may enable the relatively easy addition of more buffer dies and associated memory devices to increase memory storage capacity. As yet another example, some embodiments using one or more aspects of the disclosure may provide an improved (e.g., simplified) upgrade path for compute dies without affecting buffer die functionality.

In some embodiments, and depending on the implementation details, one or more memory access schemes in accordance with the disclosure may provide improved performance. For example, by separating the compute functions and buffer (e.g., memory) functions into different dies, each die may be designed and/or optimized for its specific task.

In some embodiments, and depending on the implementation details, one or more memory access schemes in accordance with the disclosure may provide increased flexibility. For example, implementing separate dies for compute and buffer (e.g., memory) functions may enable more flexibility in system design and/or architecture because as each die may be designed and/or tested independently.

In some embodiments, and depending on the implementation details, one or more memory access schemes in accordance with the disclosure may provide reduced power consumption. For example, by designing and/or optimizing dies for specific tasks, power consumption for each can be reduced, thereby leading to overall improved energy efficiency.

In some embodiments, and depending on the implementation details, one or more memory access schemes in accordance with the disclosure may enable simplified design and/or testing. For example, separating compute and buffer (e.g., memory) functions into different dies may simplify a design and/or testing process, as each die may be designed and/or tested independently.

Any of the functionality and/or components disclosed herein, including any of the memory devices, memory controllers, compute resources, transaction converters, format converters, interface circuits, logic (e.g., protocol logic, flow control logic, raw format logic, data reliability logic, transition logic, packing and/or unpacking logic, retry logic, retry response logic, error detection logic, error correction logic, encoding and/or decoding logic, and/or the like), layers, interfaces, and/or the like may be implemented with circuitry such as combinational logic, sequential logic, timers, counters, registers, state machines, accelerators, embedded processors, microcontrollers, CPUs, GPUs, NPUs, TPUs, DSPs, and/or the like, some of which may execute instructions stored in any type of memory and/or implement any type of execution environment such as a container, a virtual machine, an operating system, and/or the like, or a combination thereof.

One or more aspects of the disclosure may be implemented in one or more configurations as follows:

Configuration 1: an apparatus including a die including a memory interface, a die-to-die (D2D) circuit including a D2D interface, and an intermediate section connected between the memory interface and the D2D interface, wherein the intermediate section may include a transaction converter.

Configuration 2: the apparatus of configuration 1, wherein the intermediate section may be configured to transfer data through the D2D interface using a protocol.

Configuration 3: the apparatus of configuration 2, further including a memory controller connected between the memory interface and the transaction converter.

Configuration 4: the apparatus of configuration 3, wherein the memory interface may be connected to the transaction converter using a protocol interface.

Configuration 5: the apparatus of configuration 4, wherein the transaction converter may be configured to convert a transaction between the protocol interface and the D2D interface.

Configuration 6: the apparatus of configuration 2, wherein the intermediate section may include one or more compute resources.

Configuration 7: the apparatus of configuration 6, wherein the transaction converter may be configured to convert a memory transaction to a form for the one or more compute resources.

Configuration 8: the apparatus of configuration 6, further including a format converter connected to the one or more compute resources and the D2D interface.

Configuration 9: the apparatus of configuration 2, further including a memory controller connected between the memory interface and the transaction converter, and one or more compute resources configured to perform an operation on data transferred using the transaction converter.

Configuration 10: the apparatus of configuration 2, wherein the protocol may include an on-die protocol.

Configuration 11: the apparatus of configuration 2, wherein the D2D circuit transfers data using flow control.

Configuration 12: the apparatus of configuration 2, wherein the D2D circuit transfers data using a raw format.

Configuration 13: the apparatus of configuration 2, wherein the D2D circuit transfers data using signal tunneling.

Configuration 14: the apparatus of configuration 1, wherein the D2D interface may be configured to transfer data using flow control.

Configuration 15: the apparatus of configuration 14, wherein the transaction converter may be configured to convert a memory transaction to the D2D interface.

Configuration 70: the apparatus of configuration 14, wherein the intermediate section may include one or more compute resources.

Configuration 17: the apparatus of configuration 70, wherein the transaction converter may be configured to convert a memory transaction to a form for the one or more compute resources.

Configuration 18: the apparatus of configuration 15, further including a format converter connected to the one or more compute resources and the D2D interface.

Configuration 19: the apparatus of configuration 14, wherein the transaction converter may be configured to convert a memory transaction to a D2D link interface.

Configuration 20: the apparatus of configuration 14, further including one or more compute resources configured to perform an operation on data transferred using the transaction converter, and a format converter connected to the one or more compute resources and a D2D link interface.

Configuration 21: the apparatus of configuration 14 further including a memory controller connected between the memory interface and the transaction converter.

Configuration 22: the apparatus of configuration 1, wherein the D2D interface may be configured to transfer data using a raw format, Configuration 23: the apparatus of configuration 22, wherein the intermediate section may include one or more compute resources.

Configuration 24: the apparatus of configuration 23, wherein the transaction converter may be configured to convert a memory transaction to a form for the one or more compute resources.

Configuration 25: the apparatus of configuration 23, further including a format converter connected to the one or more compute resources and the D2D interface.

Configuration 26: the apparatus of configuration 22, wherein the intermediate section may be configured to control a reliability of data transferred using the D2D circuit.

Configuration 27: the apparatus of configuration 26, wherein the intermediate section may be configured to detect an error in data transferred using the D2D circuit.

Configuration 28: the apparatus of configuration 26, wherein the intermediate section may be configured to correct an error in data transferred using the D2D circuit.

Configuration 29: the apparatus of configuration 22, wherein the transaction converter may be configured to convert a memory transaction to a D2D phy interface.

Configuration 30: the apparatus of configuration 22, further including one or more compute resources configured to perform an operation on data transferred using the transaction converter, and a format converter connected to the one or more compute resources and a D2D phy interface.

Configuration 31: the apparatus of configuration 22 further including a memory controller connected between the memory interface and the transaction converter.

Configuration 32; the apparatus of configuration 31 wherein the transaction converter may be configured to pack data into a raw format.

Configuration 33: the apparatus of configuration 31 wherein the transaction converter may be configured to perform a retry operation.

Configuration 34: the apparatus of configuration 31 wherein the transaction converter may be configured to correct an error in data.

Configuration 35: An apparatus including a die including a memory interface, a die-to-die (D2D) circuit including a D2D interface, and a transaction converter connected between the memory interface and the D2D interface.

Configuration 36: the apparatus of configuration 35, further including a protocol layer connected between the memory interface and the D2D interface.

Configuration 37: the apparatus of configuration 36, wherein the D2D circuit may include a link layer, and the D2D interface may include a D2D link interface.

Configuration 38; the apparatus of configuration 36, wherein the protocol layer may be configured to use an on-die protocol.

Configuration 39: the apparatus of configuration 36, further including a memory controller connected between the memory interface and the protocol layer.

Configuration 40: the apparatus of configuration 36, further including a compute resource connected between the memory interface and the D2D interface.

Configuration 41: the apparatus of configuration 40, further including a format converter connected between the compute resource and the D2D interface.

Configuration 42: the apparatus of configuration 35, wherein the D2D circuit may include a link layer configured to transfer data using flow control.

Configuration 43: the apparatus of configuration 42, further including a compute resource connected between the transaction converter and the link layer.

Configuration 44: the apparatus of configuration 43, further including a format converter connected between the compute resource and the link layer.

Configuration 45; the apparatus of configuration 36, further including a memory controller connected between the memory interface and the transaction converter.

Configuration 46: the apparatus of configuration 35, wherein the D2D circuit may include a phy layer configured to transfer data using a raw format.

Configuration 47: the apparatus of configuration 46, further including a compute resource connected between the transaction converter and the phy layer.

Configuration 48: the apparatus of configuration 47, further including a format converter connected between the compute resource and the phy layer.

Configuration 49: the apparatus of configuration 46, further including a memory controller connected between the memory interface and the transaction converter.

Configuration 50: the apparatus of configuration 46, wherein the transaction converter may be configured to pack data into the raw format.

Configuration 51: the apparatus of configuration 46, wherein the transaction converter may be configured to perform a retry operation.

Configuration 52: the apparatus of configuration 46, wherein the transaction converter may be configured to correct an error in data.

Configuration 53: the apparatus of configuration 1, wherein the intermediate section may include a memory controller.

Configuration 54: the apparatus of configuration 1, wherein the intermediate section may include one or more compute resources.

Configuration 55; an apparatus including a die including a memory interface, a die-to-die (D2D) circuit including a D2D interface, and an intermediate section configured to transfer data using the memory interface and the D2D interface, wherein the intermediate section may include a transaction converter.

Configuration 56: the apparatus of configuration 55, wherein the intermediate section may include a memory controller.

Configuration 57: the apparatus of configuration 55, wherein the intermediate section may include one or more compute resources.

Configuration 58; the apparatus of configuration 55, wherein the intermediate section may be configured to transfer data using a protocol.

Configuration 59: the apparatus of configuration 55, wherein the D2D interface may be configured to transfer data using flow control.

Configuration 60: the apparatus of configuration 5, wherein the D2D interface may include a D2D link interface, and the transaction converter may be configured to convert a memory transaction to the D2D link interface, Configuration 61: the apparatus of configuration 55, wherein the D2D interface may be configured to transfer data using a raw format.

Configuration 62: the apparatus of configuration 61, wherein the D2D interface may include a D2D phy interface, and the transaction converter may be configured to convert a memory transaction to the D2D phy interface.

Configuration 63: the apparatus of configuration 62, wherein the intermediate section may be configured to pack data into a raw format.

Configuration 64: the apparatus of configuration 55 wherein the D2D interface may include a D2D link interface, and the intermediate section may include a memory controller configured to access a memory device using the memory interface, and a transaction converter connected to the memory controller using a protocol interface, wherein the transaction converter may be configured to convert a memory transaction between the protocol interface and the D2D link interface, Configuration 65: the apparatus of configuration 55 wherein the D2D interface may include a D2D link interface, and the intermediate section may include a transaction converter configured to convert a memory transaction between the memory interface and the D2D link interface.

Configuration 66: the apparatus of configuration 55 wherein the D2D interface may include a D2D phy interface, and the intermediate section may include a transaction converter configured to convert a memory transaction between the memory interface and the D2D phy interface.

Configuration 67; the apparatus of configuration 55 wherein the D2D interface may include a D2D link interface, and the intermediate section may include a memory controller configured to access a memory device using the memory interface, and a transaction converter connected to the memory controller using a protocol interface, a compute resource connected to the transaction converter, and a format converter connected to the compute resource and the D2D link interface, wherein the transaction converter may be configured to convert a memory transaction between the protocol interface and the compute resource, and wherein the format converter may be configured to convert one or more signals between the compute resource and the D2D link interface.

Configuration 68: the apparatus of configuration 55 wherein the D2D interface may include a D2D link interface, and the intermediate section may include a transaction converter, a compute resource connected to the transaction converter, and a format converter connected to the compute resource and the D2D link interface, wherein the transaction converter may be configured to convert a memory transaction between the memory interface and the compute resource, and wherein the format converter may be configured to convert one or more signals between the compute resource and the D2D link interface.

Configuration 69: the apparatus of configuration 55 wherein the D2D interface may include a D2D phy interface, and the intermediate section may include a transaction converter, a compute resource connected to the transaction converter, and a format converter connected to the compute resource and the D2D phy interface, wherein the transaction converter may be configured to convert a memory transaction between the memory interface and the compute resource, and wherein the format converter may be configured to convert one or more signals between the compute resource and the D2D phy interface.

Configuration 70: an apparatus including a die including a memory interface, a die-to-die (D2D) circuit including a D2D interface, and a transaction converter connected between the memory interface and the D2D interface.

Configuration 71: the apparatus of configuration 70, further including a protocol layer connected between the memory interface and the D2D interface.

Configuration 72: the apparatus of configuration 70, wherein the D2D circuit may include a link layer configured to transfer data using flow control.

Configuration 73; the apparatus of configuration 70, wherein the D2D circuit may include a phy layer configured to transfer data using a raw format.

Configuration 74: the apparatus of configuration 12, wherein the intermediate section may be configured to perform a retry operation.

Configuration 75: the apparatus of configuration 12, wherein the intermediate section may be configured to perform an error correction operation.

Configuration 76: An apparatus including a die including a memory interface, a die-to-die (D2D) circuit including a D2D interface, and a transaction converter configured to transfer data using the memory interface and the D2D interface.

Configuration 77: a method including performing, at a die, using a memory interface, a memory transaction, converting, at the die, the memory transaction to a form for a die-to-die (D2D) interface, and transferring, using the D2D interface, data associated with the memory transaction.

Configuration 78: a method including performing, at a die, using a memory interface, a memory transaction, converting, at the die, the memory transaction to a form for a die-to-die (D2D) interface, and transferring, using the D2D interface, data associated with the memory transaction.

Configuration 79: the method of configuration 78, wherein the converting may be performed using a protocol.

Configuration 80: the method of configuration 78, wherein the D2D interface performs the transferring using flow control.

Configuration 81: the method of configuration 78, wherein the D2D interface performs the transferring using a raw format.

Configuration 82: the apparatus of configuration 6, wherein at least a portion of the one or more compute resources may be connected to a path between the transaction converter and the D2D interface.

Configuration 83: the apparatus of configuration 6, wherein at least a portion of the one or more compute resources may be connected to a path between the transaction converter and the memory interface.

Configuration 83: the apparatus of configuration 6, wherein the one or more compute resources may include a network-on-chip.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner. The various details and embodiments described above may be combined to produce additional embodiments according to the inventive principles of this patent disclosure.

In some embodiments, a portion of an element may refer to less than, or all of, the element. A first portion of an element and a second portion of the element may refer to the same portions of the element. A first portion of an element and a second portion of the element may overlap (e.g., a portion of the first portion may be the same as a portion of the second portion).

Since the inventive principles of this patent disclosure may be modified in arrangement and detail without departing from the inventive concepts, such changes and modifications are considered to fall within the scope of the following claims.

The invention claimed is:

1. An apparatus comprising:

a first die comprising:

a memory interface configured to transfer data using a memory transaction;

a first die-to-die (D2D) circuit comprising a first D2D interface configured to transfer data using at least one transfer unit; and a transaction converter configured to convert between the memory transaction and the at least one transfer unit; and a second die comprising:

a second D2D circuit comprising a second D2D interface connected to the first D2D interface; and a memory controller connected to the second D2D circuit and configured to communicate with the memory interface.

2. The apparatus of claim 1, wherein the first die comprises one or more compute resources.

3. The apparatus of claim 1, wherein:

the first D2D interface comprises a D2D link interface; and the transaction converter is configured to convert the memory transaction to the D2D link interface.

4. The apparatus of claim 1, wherein the first D2D interface is configured to transfer data using a raw format.

5. The apparatus of claim 4, wherein:

the first D2D interface comprises a D2D phy interface; and the transaction converter is configured to convert a memory transaction to the D2D phy interface.

6. The apparatus of claim 5, wherein the first die is configured to pack data into a raw format.

7. The apparatus of claim 1 wherein:

the transaction converter is a first transaction converter;

the first D2D interface comprises a D2D link interface; and the second die comprises a second transaction converter configured to convert the memory transaction between the memory interface and the D2D link interface.

8. The apparatus of claim 1 wherein:

the transaction converter is a first transaction converter;

the first D2D interface comprises a D2D phy interface; and the second die comprises a second transaction converter configured to convert the memory transaction between the memory interface and the D2D phy interface.

9. The apparatus of claim 1, wherein the at least one transfer unit is configured for a raw format.

10. The apparatus of claim 1, wherein the at least one transfer unit comprises at least one flow control unit.

11. An apparatus comprising:

a die comprising:

a memory interface;

a die-to-die (D2D) circuit comprising a D2D interface; and an intermediate section configured to transfer data using the memory interface and the D2D interface, wherein the intermediate section comprises a transaction converter;

wherein the D2D interface comprises a D2D link interface, and the intermediate section comprises:

a memory controller configured to access a memory device using the memory interface;

a transaction converter connected to the memory controller using a protocol interface;

a compute resource connected to the transaction converter; and a format converter connected to the compute resource and the D2D link interface;

wherein the transaction converter is configured to convert a memory transaction between the protocol interface and the compute resource; and wherein the format converter is configured to convert one or more signals between the compute resource and the D2D link interface.

12. An apparatus comprising:

a die comprising:

a memory interface;

a die-to-die (D2D) circuit comprising a D2D interface; and an intermediate section configured to transfer data using the memory interface and the D2D interface, wherein the intermediate section comprises a transaction converter;

wherein the D2D interface comprises a D2D link interface, and the intermediate section comprises:

a transaction converter;

a compute resource connected to the transaction converter; and a format converter connected to the compute resource and the D2D link interface;

wherein the transaction converter is configured to convert a memory transaction between the memory interface and the compute resource; and wherein the format converter is configured to convert one or more signals between the compute resource and the D2D link interface.

13. An apparatus comprising:

a die comprising:

a memory interface;

a die-to-die (D2D) circuit comprising a D2D interface; and an intermediate section configured to transfer data using the memory interface and the D2D interface, wherein the intermediate section comprises a transaction converter;

wherein the D2D interface comprises a D2D phy interface, and the intermediate section comprises:

a transaction converter;

a compute resource connected to the transaction converter; and a format converter connected to the compute resource and the D2D phy interface;

wherein the transaction converter is configured to convert a memory transaction between the memory interface and the compute resource; and wherein the format converter is configured to convert one or more signals between the compute resource and the D2D phy interface.

14. An apparatus comprising:

a first die comprising:

a memory interface configured to transfer data using a memory transaction;

a first die-to-die (D2D) circuit comprising a first D2D interface configured to transfer data using at least one transfer unit; and a first transaction converter connected between the memory interface and the first D2D interface and configured to convert between the memory transaction and the at least one transfer unit; and a second die comprising:

a second D2D circuit comprising a second D2D interface connected to the first D2D interface and configured to transfer data using the at least one transfer unit; and a second transaction converter connected to the second D2D circuit and configured to convert between the memory transaction and the at least one transfer unit.

15. The apparatus of claim 14, further comprising a protocol layer connected between the memory interface and the first D2D interface.

16. The apparatus of claim 14, wherein the first D2D circuit comprises a link layer configured to transfer data using flow control.

17. The apparatus of claim 14, wherein the first D2D circuit comprises a phy layer configured to transfer data using a raw format.

18. The apparatus of claim 14, wherein the at least one transfer unit is configured for a raw format.

19. The apparatus of claim 14, wherein the at least one transfer unit comprises at least one flow control unit.

20. A method comprising:

performing, at a first die, using a memory interface, a memory transaction;

converting, at the first die, the memory transaction to a form comprising at least one transfer unit for a first die-to-die (D2D) interface;

transferring, from the first die to a second die comprising a second D2D interface, using the first D2D interface, the second D2D interface, and the at least one transfer unit, data associated with the memory transaction; and converting, at the second die, the at least one transfer unit to the memory transaction.

* * * * *